United States Patent [19]
Hirokane et al.

[11] Patent Number: 5,648,162
[45] Date of Patent: Jul. 15, 1997

[54] MAGNETO-OPTICAL RECORDING MEDIUM AND A METHOD OF RECORDING AND/OR REPRODUCING USING THE SAME

[75] Inventors: Junji Hirokane; Hiroyuki Katayama; Akira Takahashi, all of Nara; Kenji Ohta, Kitakatsuragi-gun, all of Japan

[73] Assignee: Sharp Kabushiki Kaisha, Osaka, Japan

[21] Appl. No.: 177,096

[22] Filed: Dec. 30, 1993

[30] Foreign Application Priority Data

Jan. 7, 1993 [JP] Japan .................................. 5-001375

[51] Int. Cl.$^6$ ...................................................... G11B 5/66
[52] U.S. Cl. ........................ 428/332; 428/336; 428/650; 428/655; 428/669; 428/677; 428/673; 428/674; 428/675; 428/676; 428/678; 428/679; 428/694 ML; 428/694 DE; 428/694 MT; 428/694 RE; 428/694 NF; 428/694 MM; 428/694 EC; 428/694 RL; 428/900; 369/13
[58] Field of Search ........................... 428/694 MM, 428/694 EC, 694 RL, 900, 332, 336, 669, 677, 673, 674, 675, 676, 678, 679, 650, 655, 694 ML, 694 DE, 694 MT, 694 RE, 694 NF; 369/13

[56] References Cited

U.S. PATENT DOCUMENTS

| | | | |
|---|---|---|---|
| 4,753,853 | 6/1988 | Sato et al. ................................. | 428/679 |
| 5,278,810 | 1/1994 | Takahashi et al. ........................ | 369/13 |

FOREIGN PATENT DOCUMENTS

| | | |
|---|---|---|
| 258978 | 3/1988 | European Pat. Off. . |
| 0 318 925 A3 | 6/1989 | European Pat. Off. . |
| 0 319 004 A3 | 6/1989 | European Pat. Off. . |
| 0 415 449 A2 | 3/1991 | European Pat. Off. . |
| 0 498 461 A3 | 8/1992 | European Pat. Off. . |
| 62-175948 | 8/1987 | Japan . |

OTHER PUBLICATIONS

Y. Fujii, et al., "Direct Overwriting and Super Resolution Readout by Exchange–Coupled Multilayer Film" Proceedings of Magneto–Optical Recording International Symposium '92, *J. Magn. Soc. Jp.*, vol. 17, Supplement No. S1 (1993), pp. 167–170.

*Primary Examiner*—Leszek Kiliman
*Attorney, Agent, or Firm*—David G. Conlin; Brian L. Michaelis

[57] ABSTRACT

A magneto-optical recording medium including a base; a readout layer formed on the base; a recording layer formed on the readout layer; and an auxiliary recording layer formed on the recording layer, each of the readout layer, recording layer and auxiliary recording layer being made of an alloy of rare-earth metal and transition metal showing ferrimagnetism. The alloy composition of each layer is determined so that the recording layer has a Curie temperature lower than Curie temperatures of the readout layer and the auxiliary recording layer and has a coercive force higher than coercive forces of the readout layer and the auxiliary recording layer at room temperature and that, when the temperature of the recording layer is raised to near its Curie temperature while perpendicularly applying a uniform recording magnetic field to each layer, a sublattice magnetic moment of the rare-earth metal of the readout layer and a sublattice magnetic moment of the rare-earth metal of the auxiliary recording layer are antiparallel to each other. And, a method of recording information on the magneto-optical recording medium. This structure enables overwriting by light-intensity modulation without using an initializing magnetic field.

23 Claims, 28 Drawing Sheets

MAGNETO-OPTICAL RECORDING MEDIUM AND A METHOD OF RECORDING AND/OR REPRODUCING USING THE SAME

FIELD OF THE INVENTION

The present invention relates to magneto-optical recording media such as magneto-optical disks, tapes and cards, for use in a magneto-optical recording device, and a method of recording and/or reproducing using such a magneto-optical recording medium.

BACKGROUND OF THE INVENTION

Magneto-optical disk memories are put to practical use as rewritable optical disk memories.

However, the magneto-optical disk memories suffer from a disadvantage in rewriting. Namely, it takes time to rewrite information. When writing information again in a portion containing information, there is a need to erase the previously recorded information before performing the rewriting.

In order to overcome such a disadvantage, overwriting by magnetic-field modulation is used as a method for overwriting without performing erasing before rewriting.

In the case of using this method, however, the following disadvantages arise. Since the overwriting is performed by modulating the magnetic field strength, it is necessary to bring a magnetic field generating mechanism close to a magneto-optical disk to obtain a magnetic field of a sufficient strength. Additionally, with this method, a magnetic field cannot be modulated at high speeds.

In order to overcome such disadvantages, Japanese Publication for Unexamined Patent Application No. 175948/1987 proposes a magneto-optical recording medium having a double-layer structure including a recording layer and auxiliary recording layer, both of which are made by a perpendicularly magnetized film, and a light-intensity modulation overwriting method capable of performing overwriting on the magneto-optical recording medium by modulating only laser power.

With the above-mentioned conventional structures, however, the direction of magnetization of the auxiliary recording layer is changed when performing overwriting. It is thus necessary to execute initialization in order to set the direction of magnetization of the auxiliary recording layer uniform in advance whenever performing the overwriting. An initializing magnetic-field generating mechanism is required in addition to a recording magnetic field generating mechanism, resulting in increases in the size of the magneto-optical recording device and the costs.

Moreover, if the diameter of a recording bit and the interval between recording bits become smaller than the diameter of a light spot formed by focusing laser light on the recording medium, adjacent recording bits enter the light spot. It is therefore impossible to reproduce a single recording bit.

SUMMARY OF THE INVENTION

An object of the present invention is to provide a magneto-optical recording medium permitting overwriting by light-intensity modulation without using an initializing magnetic field, and a recording method.

In order to achieve the above object, a magneto-optical recording medium of the present invention includes:
a substrate;
a readout layer formed on the substrate;
a recording layer formed on the readout layer;
an auxiliary recording layer formed on the recording layer, each of the readout layer, recording layer and auxiliary recording layer being made of an alloy of rare-earth metal and transition metal showing ferrimagnetism, wherein an alloy composition of each layer is determined so that the recording layer has a Curie temperature lower than Curie temperatures of the readout layer and the auxiliary recording layer and has a coercive force higher than coercive forces of the readout layer and the auxiliary recording layer at room temperature and that, when the recording layer is raised to a temperature near its Curie temperature while perpendicularly applying a uniform recording magnetic field to each layer, a sublattice magnetic moment of the rare-earth metal of the readout layer and a sublattice magnetic moment of the rare-earth metal of the auxiliary recording layer are antiparallel to each other.

With this structure, when a temperature is raised to near the Curie temperature of the recording layer, the direction of magnetization of the recording layer is determined by the balance among a magnetostatic coupling force for aligning the direction of magnetization of the recording layer with the direction of a recording magnetic field, an exchange coupling force for aligning the sublattice magnetic moment of the readout layer with the sublattice magnetic moment of the recording layer and an exchange coupling force for aligning the sublattice magnetic moment of the auxiliary recording layer with the sublattice magnetic moment of the recording layer. The alloy composition of each layer is determined such that, when the recording layer is raised to a temperature in the vicinity of its Curie temperature while applying a uniform recording magnetic field thereto, the sublattice magnetic moment of the rare-earth of the readout layer and that of the auxiliary recording layer become antiparallel to each other. Therefore, if the power of the laser light is modulated, a change is produced in the temperature distribution in a direction perpendicular to each layer when the temperature is raised or lowered. This flips the direction of magnetization determined by the balance among the above-mentioned forces, and thereby allowing overwriting by light-intensity modulation.

In order to achieve the above object, a method of recording information on the magneto-optical recording medium according to the present invention applies the laser light to each layer of the magneto-optical recording medium after modulating laser light power between high and low according to information to be recorded while perpendicularly applying a uniform recording magnetic field to each layer, and controls an exchange coupling force between the recording layer and the readout layer and an exchange coupling force between the recording layer and the auxiliary recording layer to cause the recording layer to have upward magnetization or downward magnetization according to the laser light power.

This structure allows the light-intensity modulation overwriting on the magneto-optical recording medium.

Another object of the present invention is to provide a magneto-optical recording medium which permits overwriting by light-intensity modulation without using an initializing magnetic field and super-resolution readout, and a method of recording and reproducing information on the magneto-optical recording medium.

In order to achieve the above object, a magneto-optical recording medium of the present invention has the above-mentioned structure and the recording layer whose alloy composition is determined to make the sublattice magnetic moment of the rare-earth metal of the readout layer and that of the auxiliary recording layer antiparallel to each other.

The magneto-optical recording medium of this structure has functions and effects which are similar to those of the above-mentioned magneto-optical recording medium. With this structure, if the intensity of the laser light is adjusted to cause only a center portion of an area exposed to a spot of the laser light to have perpendicular magnetization, it is possible to reproduce a recording bit which is smaller than the diameter of a laser spot. The recording density is thus improved.

In order to achieve the above object, a recording and reproducing method of the present invention is designed to record and reproduce information on the magneto-optical recording medium. With this method, recording is performed by applying the laser light to each layer of the magneto-optical recording medium after modulating laser light power between high and low level according to information to be recorded while perpendicularly applying a uniform recording magnetic field to each layer, and by controlling an exchange coupling force between the recording layer and the readout layer and an exchange coupling force between the recording layer and the auxiliary recording layer to cause the recording layer to have upward magnetization or downward magnetization according to the laser light power. With this method, information is indirectly reproduced from the recording layer by applying through the substrate the laser light of a power which is lower than the low power for recording and is capable of causing only a center portion of an area of the readout layer exposed to the laser light to have perpendicular magnetization so as to cause a sublattice magnetic moment of the rare-earth metal at the center portion to take up a stable orientation with respect to a sublattice magnetic moment of the rare-earth metal of the recording layer and by reading a direction of magnetization of the center portion using the polar Kerr effect.

This structure enables the light-modulation overwriting and a reproduction of a recording bit which is smaller than the laser spot on the magneto-optical recording medium.

For a fuller understanding of the nature and advantages of the invention, reference should be made to the ensuing detailed description taken in conjunction with the accompanying drawings.

BRIEF DESCRIPTION OF THE DRAWINGS

FIG. 1 is an explanatory view showing a schematic structure of a magneto-optical recording medium.

FIG. 2 is a graph showing an example of the temperature dependence of coercive force of each of the layers of the magneto-optical recording medium of FIG. 1 when each of these layer is formed alone.

FIG. 3 is an explanatory view showing a process of recording and reproducing information when the layers of the magneto-optical recording medium of FIG. 1 have magnetic properties shown in FIG. 2.

FIG. 4 is a graph showing the temperature dependence of coercive force of each of the layers of FIG. 2 when the layers are laminated.

FIG. 5 is a graph showing the relationship between hysteresis properties of the polar Kerr rotation angle produced by a magnetic field in the layers shown in FIG. 2 and and temperatures.

FIG. 6 is an explanatory view showing another process of recording and reproducing information on the magneto-optical recording medium of FIG. 1.

FIG. 7 is a graph showing another example of the temperature dependence of coercive force of each of the layers of the magneto-optical recording medium of FIG. 1 when each of these layers is formed alone.

FIG. 8 is an explanatory view showing a process of recording and reproducing information when the layers of the magneto-optical recording medium of FIG. 1 have magnetic properties shown in FIG. 7.

FIG. 9 is a graph showing another example of the temperature dependence-of coercive force of each of the layers of the magneto-optical recording medium of FIG. 1 when each of these layers is formed alone.

FIG. 10 is an explanatory view showing a process of recording and reproducing information when the layers of the magneto-optical recording medium of FIG. 1 have magnetic properties shown in FIG. 9.

FIG. 11 is an explanatory view showing a schematic structure of a magneto-optical recording medium.

FIG. 12 is a graph showing an example of the temperature dependence of coercive force of each of the layers of the magneto-optical recording medium of FIG. 11 when each of these layers is formed alone.

FIG. 13 is an explanatory view showing a process of recording and reproducing information when the layers of the magneto-optical recording medium of FIG. 11 have magnetic properties shown in FIG. 12.

FIG. 14 is a graph showing the temperature dependence of coercive force of each of the layers of FIG. 12 when the layers are laminated.

FIG. 15 is a graph showing the relationship between hysteresis properties of the polar Kerr rotation angle produced by a magnetic field in the layers shown in FIG. 12 and and temperatures.

FIG. 16 is a graph showing another example of the temperature dependence of coercive force of each of the layers of FIG. 12 when the layers are placed alone.

FIG. 17 is an explanatory view showing a process of recording and reproducing information when the layers of the magneto-optical recording medium of FIG. 11 have magnetic properties shown in FIG. 16.

FIG. 18 is a graph showing another example of the temperature dependence of coercive force of each of the layers of the magneto-optical recording medium of FIG. 11 when each of these layers is formed alone.

FIG. 19 is an explanatory view showing a process of recording and reproducing information when the layers of the magneto-optical recording medium of FIG. 11 have magnetic properties shown in FIG. 18.

FIG. 21 is an explanatory view showing a schematic structure of a magneto-optical recording medium.

FIG. 22 is a graph showing the composition dependence of Curie temperature ($T_C$) and compensation temperature ($T_{comp}$) of $Gd_x(Fe_{0.82}Co_{0.18})_{1-x}$.

FIG. 23 is an explanatory view showing an example of the arrangement of lands and grooves formed on a substrate of a magneto-optical disk.

FIG. 24 is an explanatory view showing another example of the arrangement of lands and grooves formed on the substrate of the magneto-optical disk.

FIG. 25 is an explanatory view showing an example of an arrangement of wobbly pits formed on the substrate of the magneto-optical disk.

FIG. 26 is an explanatory view showing another example of an arrangement of wobbly pits formed on the substrate of the magneto-optical disk.

FIG. 27 is an explanatory view showing an example of wobbly grooves formed on the substrate of the magneto-optical disk.

FIG. 28 is an explanatory view showing a method of recording and reproducing information on the magneto-optical disk using a plurality of light beams.

FIG. 29 is an explanatory view showing a method of overwriting by magnetic-field modulation on the magneto-optical disk.

FIG. 30 is an explanatory view showing a single-sided type magneto-optical disk having the structure of FIG. 21.

FIG. 31 is an explanatory view showing a double-sided type magneto-optical disk having the structure of FIG. 21.

DESCRIPTION OF THE PREFERRED EMBODIMENTS

The following description discusses one embodiment of the present invention with reference to FIGS. 1 to 10.

Figure 1:
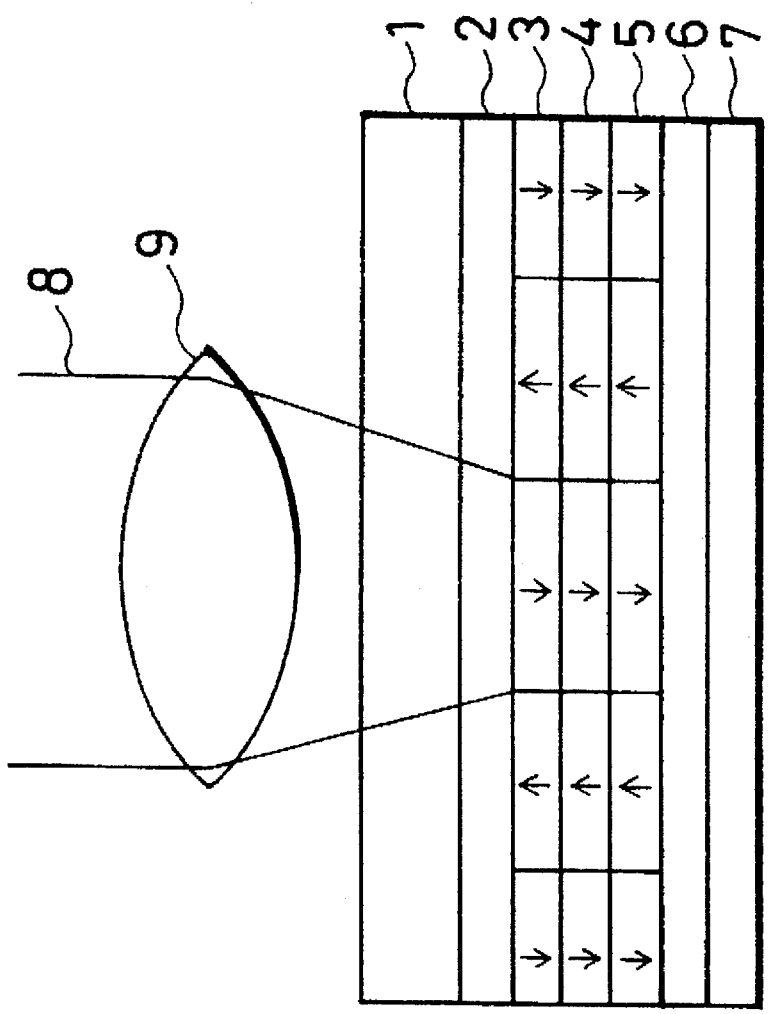
FIG. 1 through FIG. 10 show the first embodiment of the present invention.

As illustrated in FIG. 1, a magneto-optical recording medium of this embodiment has a multi-layer structure and is formed by laminating a transparent dielectric layer 2, a readout layer 3, a recording layer 4, an auxiliary recording layer 5, a protective film 6 and an overcoat film 7 in this order on a substrate 1. Recording and reproduction are performed by focusing laser light 8 on the readout layer 3 with a converging lens 9.

The transparent dielectric layer 2 is included to produce photo-interference effects so as to obtain improved readout characteristics.

The readout layer 3, the recording layer 4 and the auxiliary recording layer 5 are amorphous films formed by an alloy of rare-earth metal (RE) and transition metal (TM). These layers are ferrimagnetic materials in which the sublattice magnetic moment of the rare-earth metal and that of the transition metal are antiparallel to each other. FIG. 1 shows the orientations of the sublattice magnetic moments of the rare-earth metal with arrows.

Figure 2:
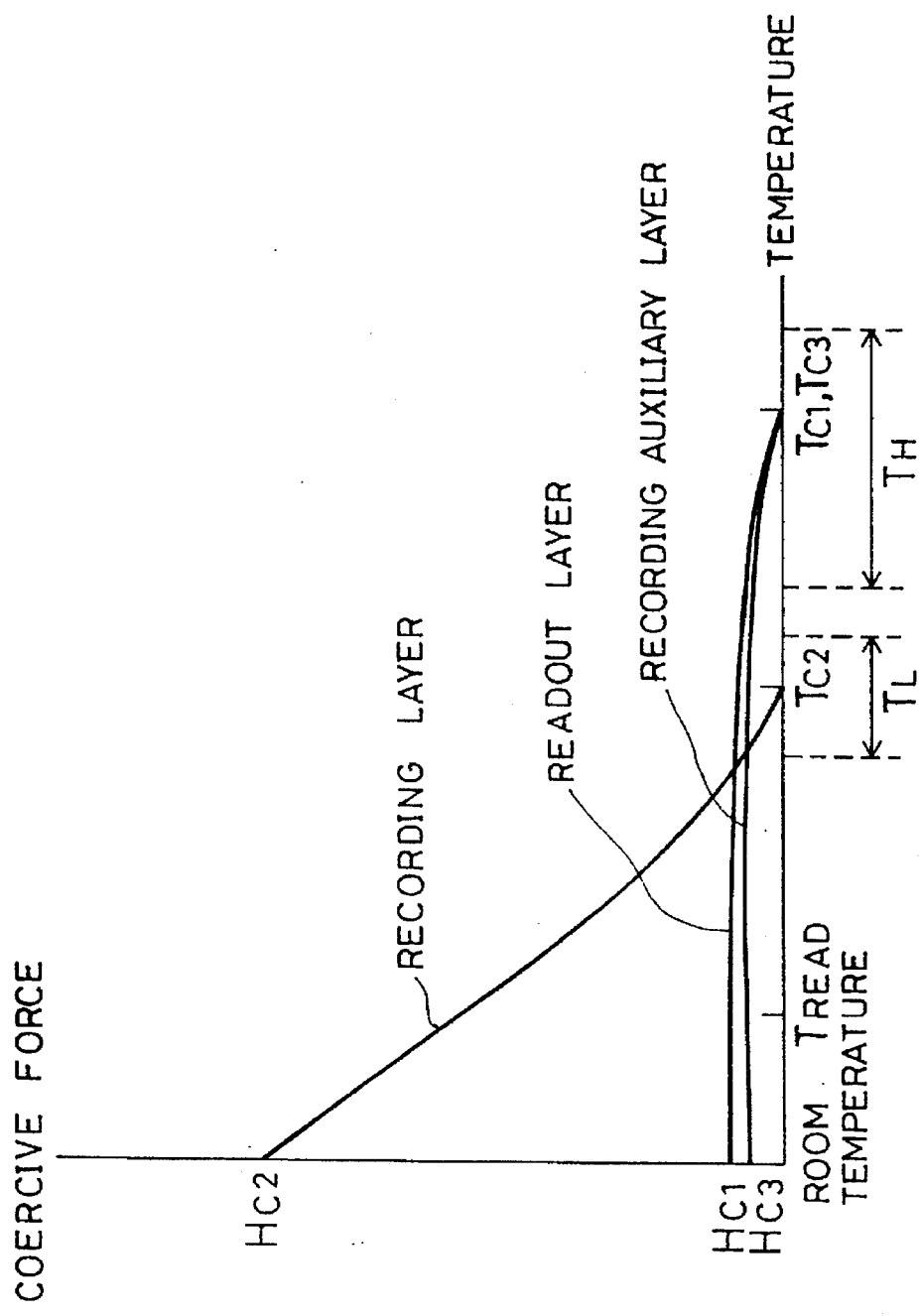
Figure 4:
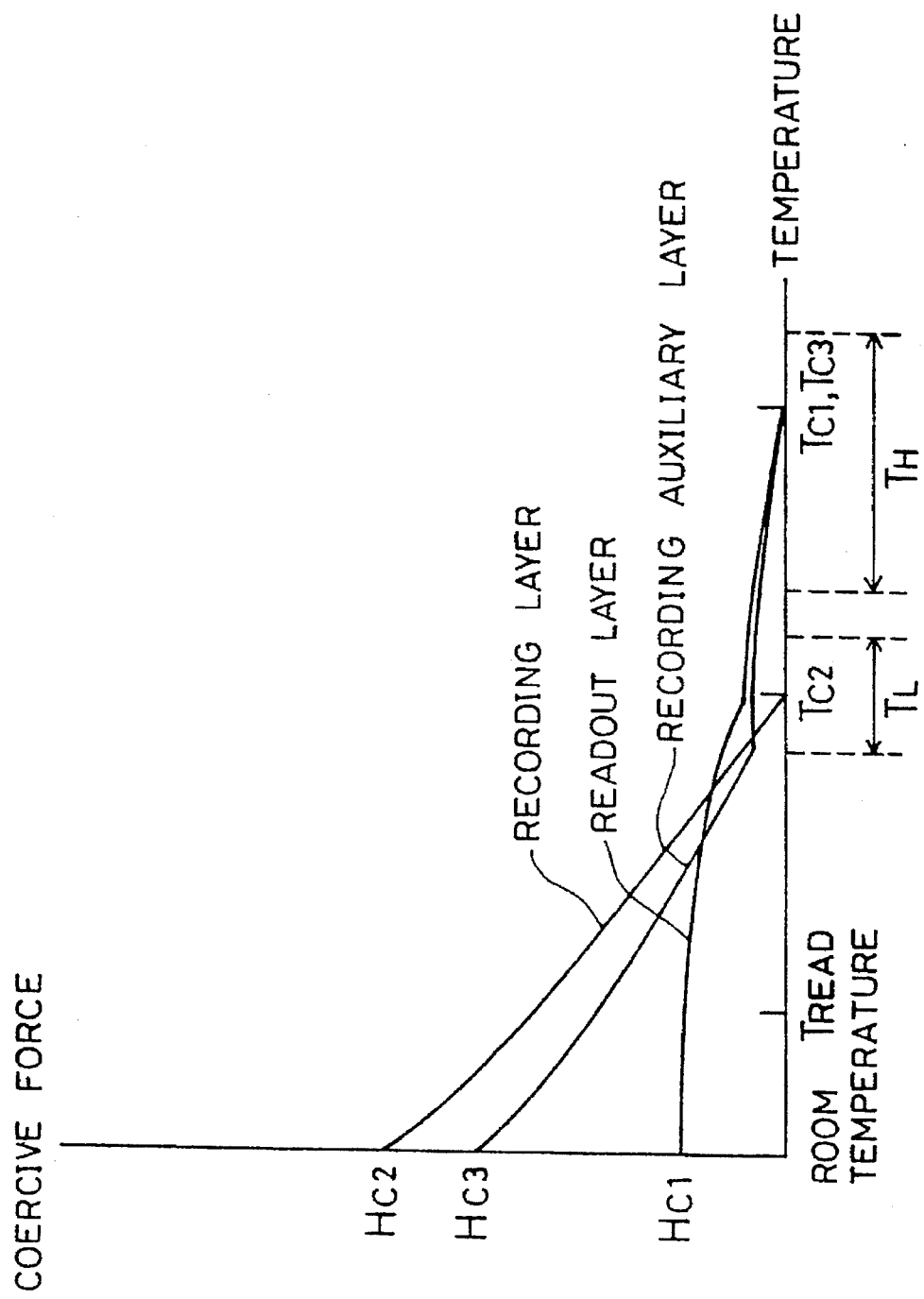

FIG. 2 shows the temperature dependence of coercive forces of the readout layer 3, the recording layer 4 and the auxiliary recording layer 5. FIG. 4 shows the temperature dependence of coercive forces of these layers formed on the substrate 1.

The protective film 6 (see FIG. 1) is provided to protect the readout layer 3, the recording layer 4 and the auxiliary recording layer 5 against oxidization, corrosion and damage.

The composition where the magnetic moment of the sublattice of the rare-earth metal balances the magnetic moment of the sublattice of the transition metal is called a compensating composition. The composition containing an amount of the rare-earth metal which is greater than that contained in the compensating composition is hereinafter referred to as RE-rich. The composition containing an amount of the transition metal which is greater than that contained in the compensating composition is called TM-rich.

If the composition is RE-rich, the orientation of magnetization is aligned with the orientation of the magnetic moment of the sublattice of the rare-earth metal. Namely, the magnetization and the magnetic moments of the sublattice of the rare-earth metal become parallel to each other. On the other hand, if the composition is TM-rich, the orientation of magnetization is aligned with the orientation of the magnetic moment of the sublattice of the transition metal. In other words, the magnetization and the magnetic moment of the sublattice of the rare-earth metal become antiparallel to each other.

Figure 3:
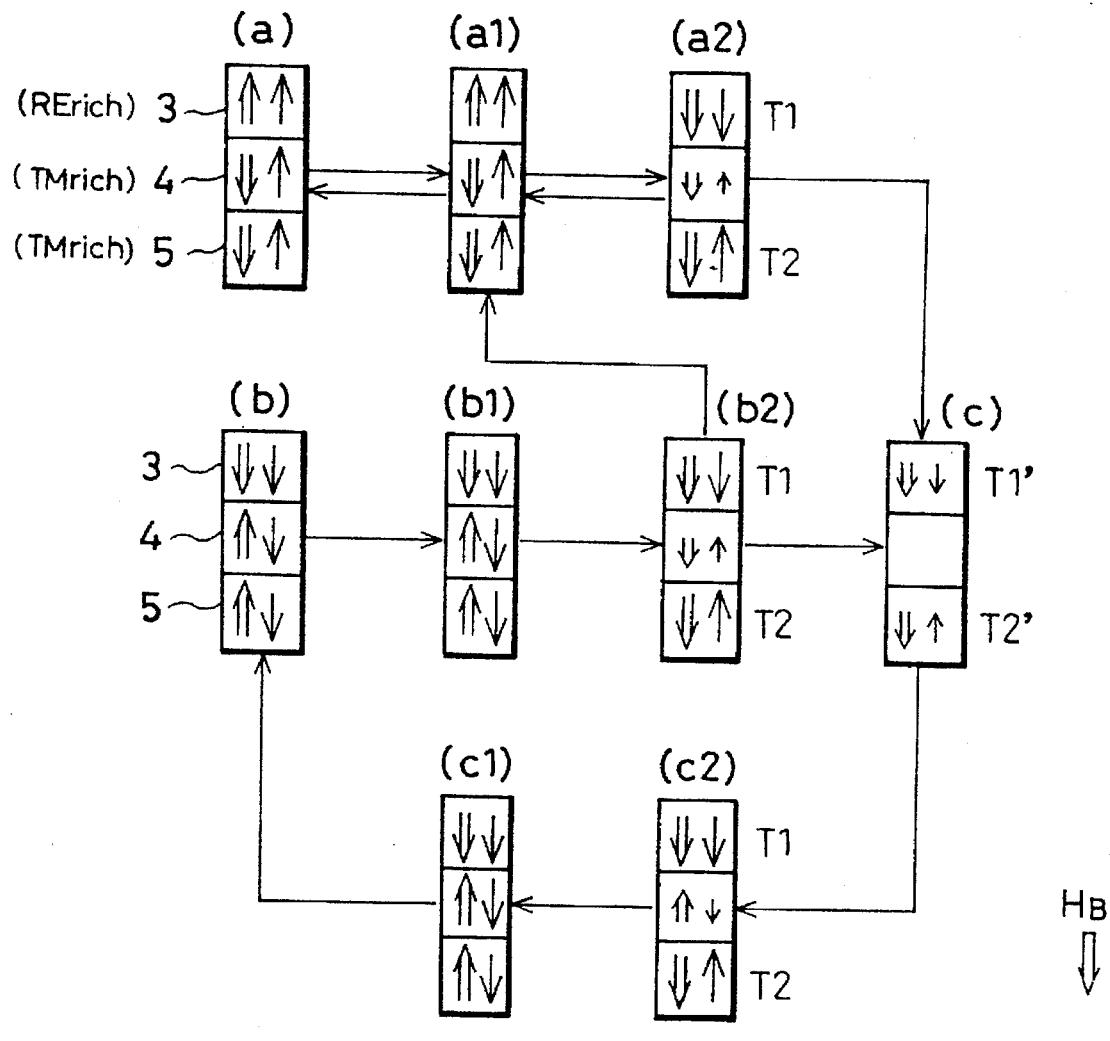

If the readout layer 3 is RE-rich and if the recording layer 4 and the auxiliary recording layer 5 are TM-rich, reproduction of information and light-intensity modulation overwriting are performed through the process shown in FIG. 3. In FIG. 3, arrows indicate the orientation of the magnetic moment of the sublattice of the rare-earth metal, while open arrows indicate the direction of magnetization.

At room temperature, state (a) where the magnetic moment of the sublattice of the rare-earth metal of each of the readout layer 3, the recording layer 4 and the auxiliary recording layer 5 is directed upward and state (b) where the sublattice magnetic moments of the rare-earth metal of these layers are all directed downward are present. The magnetization of the readout layer 3 is antiparallel to the magnetization of the recording layer 4 and of the auxiliary recording layer 5 at room temperature.

In state (a) all the sublattice magnetic moments of the transition metal are directed downward, while in state (b) all the sublattice magnetic moments of the transition metal are directed upward. Since the orientation of the magnetic moment of the sublattice of the transition metal is opposite to that of the rare-earth metal, the explanation of the orientation of the sublattice magnetic moment of the transition metal will be omitted.

When performing reproduction, the laser light 8 of a predetermined power is projected onto the magneto-optical recording medium. When the temperatures of the readout layer 3, the recording layer 4 and the auxiliary recording layer 5 are raised to $T_{read}$ of FIG. 2, the states of these layers change from (a) and (b) to (a1) and (b1). At $T_{read}$, although the coercive force of the recording layer 4 is decreased, it is still strong. Therefore, in states (a1) and (b1), the orientations of magnetization and the sublattice magnetic moments remain unchanged from states (a) and (b). Consequently, information on the recording layer 4 is reproduced by reading the orientation of magnetization of the readout layer 3 using polar Kerr effect.

When performing overwriting by light-intensity modulation, the laser light 8 of a first power which is greater than the power used for reproduction is projected onto the magneto-optical recording medium. When the temperatures of the readout layer 3, the recording layer 4 and the auxiliary recording layer 5 are increased to $T_L$ of FIG. 2, the states of these layers change from (a) and (b) to (a2) and (b2) through (a1) and (b1). $T_L$ is a temperature near the Curie temperature $T_{c2}$ of the recording layer 4. Since the direction of magnetization of the readout layer 3 and of the auxiliary recording layer 5 are aligned with the direction of a uniform magnetic field $H_B$ (downward in this embodiment), the sublattice magnetic moment of the readout layer 3 and that of the auxiliary recording layer 5 become antiparallel to each other.

The exchange coupling force from the readout layer 3 causes the magnetic moment of the sublattice of the recording layer 4 to be directed downward. The exchange coupling force from the auxiliary recording layer 5 causes the magnetic moment of the sublattice of the recording layer 4 to be directed upward. The magnetostatic coupling force produced by the recording magnetic filed $H_B$ causes the recording layer 4 to have downward magnetization. Since the laser light 8 is applied to the auxiliary recording layer 5 through the readout layer 3, (the average temperature T1 of the readout layer 3)>(the average temperature T2 of the auxiliary recording layer 5). Thus, the force to produce downward magnetization of the recording layer 4 becomes stronger than the force to produce upward magnetization. Hence, in states (a2) and (b2), the recording layer 4 has downward magnetization.

When the projection of the laser light 8 is stopped, the temperature is decreased and the coercive force of the recording layer 4 is rapidly increased. Consequently, the state of the recording layer 4 changes from (a2) and (b2) to (a) through (a1) while having downward magnetization.

Next the laser light 8 of the second power which is greater than the first power is projected onto the magneto-optical recording medium. When the temperatures of the readout layer 3, the recording layer 4 and the auxiliary recording layer 5 are increased to $T_H$ of FIG. 2, the states of these layers change from (a) and (b) to (c) through (a1), (b1), (a2) and (b2). $T_H$ is a temperature in the vicinity of the Curie temperature $T_{C1}$ of the readout layer 3. The Curie temperature $T_{C1}$ of the readout layer 3 is almost equal to the Curie temperature $T_{C3}$ of the auxiliary recording layer 5.

In state (c), since $T_H > T_{C2}$, the magnetization of the recording layer 4 becomes zero. Since the magnetization of the readout layer 3 and the auxiliary recording layer 5 are aligned with the direction of the external uniform magnetic filed $H_B$, the magnetic moment of the sublattice of the readout layer 3 becomes antiparallel to the magnetic moment of the sublattice of the auxiliary recording layer 5.

When the projection of the laser light 8 is stopped, the temperatures of these layers are decreased and their states change to (c2) at $T_L$. At this time, since the direction of magnetization of the readout layer 3 and of the auxiliary recording layer 5 are kept aligned with the direction of the external uniform magnetic filed $H_B$, the magnetic moment of the sublattice of the readout layer 3 becomes antiparallel to the magnetic moment of the sublattice of the auxiliary recording layer 5.

The exchange coupling force from the readout layer 3 causes the magnetic moment of the sublattice of the recording layer 4 to have the downward orientation, while the exchange coupling force from the auxiliary recording layer 5 causes the magnetic moment of the sublattice of the recording layer 4 to have the upward orientation. The magnetostatic force produced by the recording magnetic filed $H_B$ causes the downward magnetization of the recording layer 4. In state (c), (the average temperature T1' of the readout layer 3)>(the average temperature T2' of the auxiliary recording layer 5), diffusion of heat in the direction of the thickness of the layers proceeds with a decrease in the temperatures and the temperature differences in the direction of the thickness of the layers are eliminated. Thus, T1' and T2' become equal to each other in state (c2), and the force to produce upward magnetization of the recording layer 4 becomes greater than the force to produce downward magnetization. Consequently, the recording layer 4 has upward magnetization in state (c2).

When the temperature is further decreased, the coercive force of the recording layer 4 is rapidly increased. As a result, the state of the recording layer 4 changes to (c1) at $T_{READ}$ and to (b) at room temperature while keeping upward magnetization.

As described above, if the temperature of the recording medium is decreased to room temperature after projecting the laser light 8 of the first power, the states of the readout layer 3, the recording layer 4 and the auxiliary recording layer 5 change from (a) and (b) to (a). On the other hand, if the temperature of the recording medium is decreased to room temperature after projecting the laser light 8 of the second power, the states of these layers change from (a) and (b) to (b). It is thus possible to perform overwriting by light-intensity modulation.

When the readout layer 3, the recording layer 4 and the auxiliary recording layer 5 are formed on the substrate 1 (see FIG. 4), exchange coupling forces are produced between the layers 3 and 4 and between the layers 4 and 5. Therefore, if the magnetization of the recording layer 4 is finite (i.e., is not zero) or if the temperature of the recording layer 4 falls below $T_{C2}$, the coercive force of the readout layer 3 becomes greater than that of the readout layer 3 when formed alone (see FIG. 2). Similarly, the coercive forces of the recording layer 4 and the auxiliary recording layer 5 become substantially equal to each other, or the coercive force of the auxiliary recording layer 5 becomes slightly smaller than that of the recording layer 4.

Figure 5:
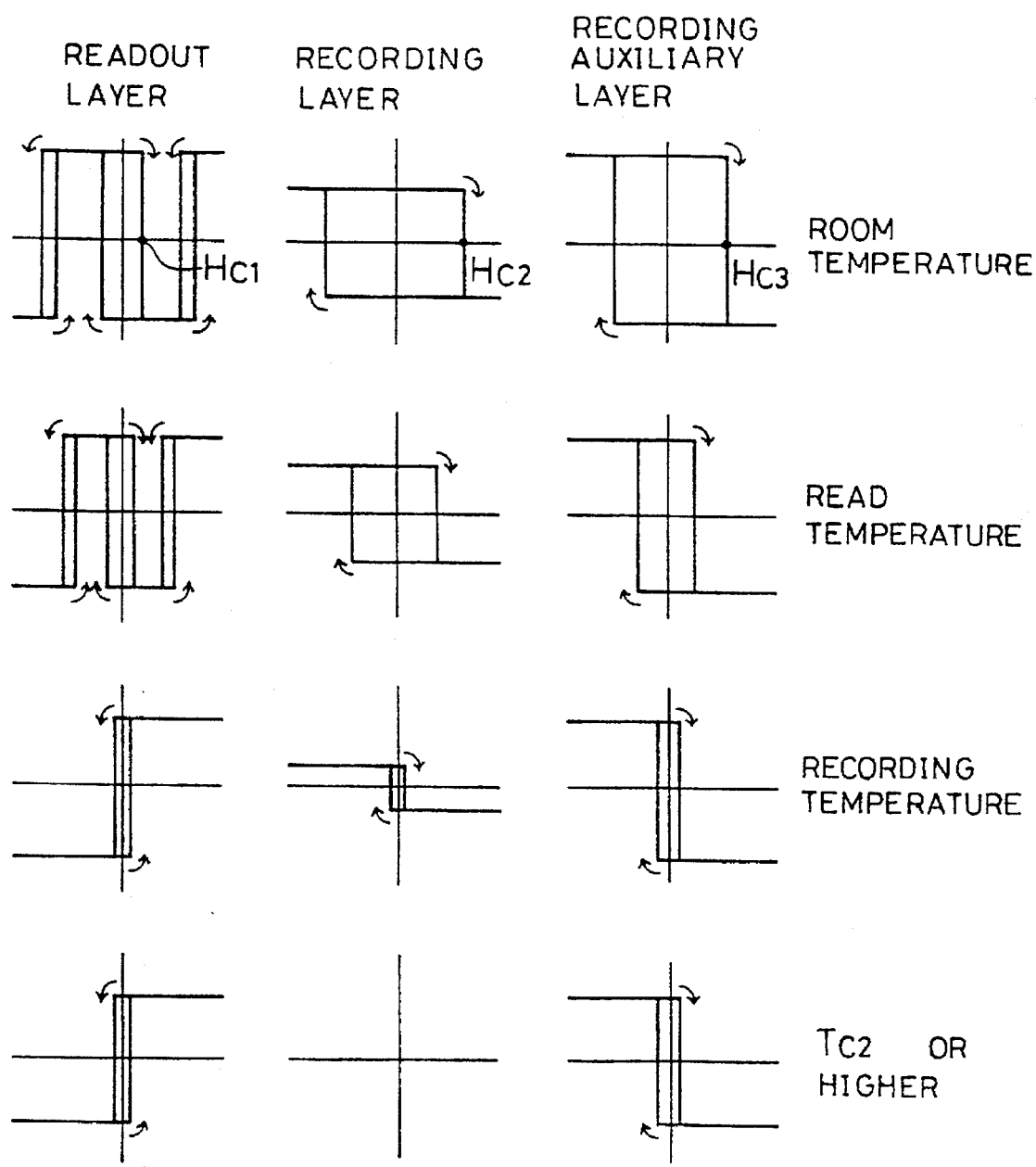
Figure 6:
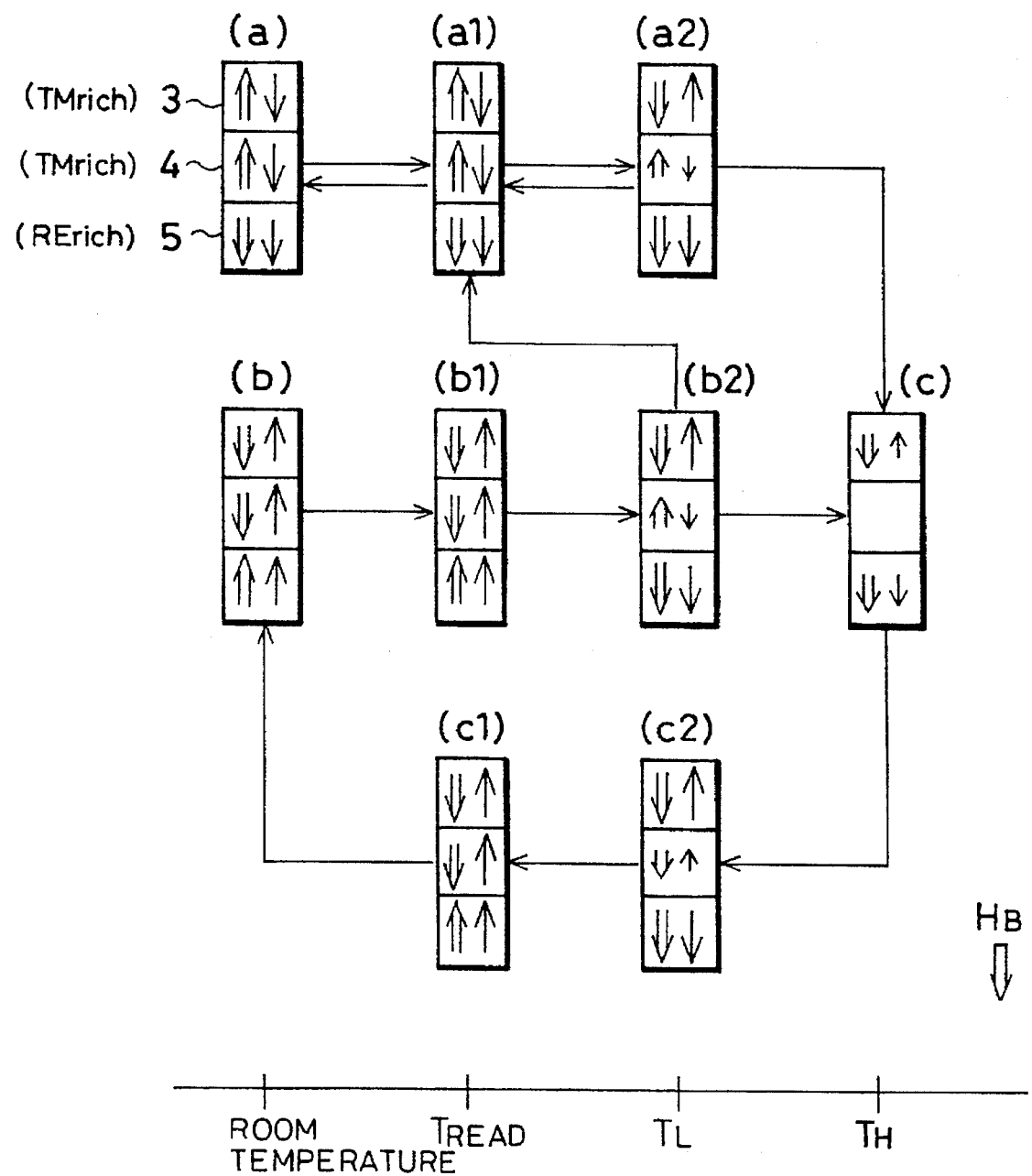

Moreover, when the readout layer 3, the recording layer 4 and the auxiliary recording layer 5 are formed on the substrate 1, the polar Kerr rotation angle of the readout layer 3 shows abnormal hysteresis characteristics at room temperature and $T_{READ}$ (reading temperature) at which the coercive force of the recording layer 4 is strong as shown in FIG. 5. Meanwhile, the recording layer 4 and the auxiliary recording layer 5 show normal hysteresis characteristics of a TM-rich magnetic substance.

The following description discusses a magneto-optical disk including the readout layer 3, the recording layer 4, and the auxiliary recording layer 5 having magnetic properties of FIG. 2 as a first sample (#1-1) of the magneto-optical recording medium of this embodiment.

The substrate 1 is made of a disk-shaped glass with a diameter of 86 mm, an inner diameter of 15 mm and a thickness of 1.2 mm. Although it is not shown, lands and grooves are formed on a surface of the substrate 1 to produce a guide track for guiding a light beam. The track is formed with a pitch of 1.6 µm, a groove width of 0.8 µm and a land width of 0.8 µm.

AlN with a thickness of 80 nm is formed as the transparent dielectric layer 2 on a surface of the substrate 1 where the guide track is formed.

The readout layer 3, the recording layer 4 and the auxiliary layer 5 having the magnetic properties of FIG. 2 are formed on the transparent dielectric layer 2.

For the readout layer 3, a thin film of rare-earth transition metal alloy made of RE-rich GdFeCo with a thickness of 50 nm is formed on the transparent dielectric layer 2. The composition of GdFeCo is $Gd_{0.26}(Fe_{0.82}Co_{0.18})_{0.74}$, and the Curie temperature thereof is around 300° C.

For the recording layer 4, a thin film of rare-earth transition metal alloy made of TM-rich DyFeCo with a thickness of 50 nm is formed on the readout layer 3. The composition of DyFeCo is $Dy_{0.23}(Fe_{0.78}Co_{0.22})_{0.77}$, and the Curie temperature thereof is around 200° C.

For the auxiliary recording layer 5, a thin film of rare-earth transition metal alloy made of TM-rich GdFeCo with a thickness of 50 nm is formed on the recording layer 4. The composition of GdFeCo is $Gd_{0.17}(Fe_{0.82}Co_{0.18})_{0.83}$, and the Curie temperature thereof is around 320° C.

AlN with a thickness of 20 nm is placed as a protective film 6 on the auxiliary recording layer 5.

A polyurethane acrylate series ultraviolet rays-hardening resin with a thickness of 5 µm is placed as an overcoat film 7 on the protective film 6.

The process of producing the magneto-optical disk is as follows.

The guide track on the surface of the glass substrate 1 is formed by reactive ion etching.

The transparent dielectric layer 2, the readout layer 3, the recording layer 4, the auxiliary recording layer 5 and the protective film 6 are respectively formed by the sputtering method under vacuum in the same sputtering device. AlN for the transparent dielectric layer 2 and the protective film 6 was formed in $N_2$ gas atmosphere by the reactive sputtering method in which the sputtering of Al target was carried out. The readout layer 3 and the recording layer 4 were formed by sputtering a so-called composite target produced by arranging Gd or Dy tips on a FeCo alloy target, or ternary alloy target of GdFeCo and DyFeCo using Ar gas.

The overcoat film 7 was formed by applying a polyurethane acrylate series ultraviolet rays-hardening resin using a spin coating machine, and by hardening the resin by projecting ultraviolet light using an ultraviolet light application device.

The magneto-optical disk thus manufactured is rotated at a linear velocity of 10 m/s, and recording is performed by modulating the laser power at a frequency of 2.5 MHz while applying a uniform magnetic field $H_B$ of 25 kA/m. Here, the first laser power was set at 6 mW, and the second laser power was set at 10 mW. As a result, a magnetic domain whose magnetization is reversed every 2 µm was formed on the recording layer 4.

Next, the power of the laser light 8 was set at 2 mW, and the reproduction of information was carried out. As a result, a magneto-optical signal of 2.5 MHz corresponding to the reversal magnetic domain was obtained from the readout layer 3.

Light-intensity modulation overwriting was performed on the reversal magnetic domain by modulating the laser power at a frequency of 5 MHz. As a result, the reversal magnetic domain disappears, and a reversal magnetic domain whose magnetization is reversed every 1 µm was formed on the recording layer 4.

Then, the power of the laser light 8 was set at 2 mW, and reproduction of information was carried out. As a result, a magneto-optical signal of 5 MHz corresponding to the reversal magnetic domain is obtained from the readout layer 3.

According to the results of experiments, the feasibility of good light-intensity modulation overwriting was confirmed.

In the above explanation about the light-intensity modulation overwriting, the magneto-optical disk having the RE-rich readout layer 3, the TM-rich recording layer 4 and the TM-rich auxiliary recording layer 5 was discussed. However, it is also possible to use a magneto-optical disk having a TM-rich readout layer 3, a TM-rich recording layer 4 and a RE-rich auxiliary recording layer 5 when performing the reproduction of information and the light-intensity modulation, overwriting through the process shown in FIG. 6. Namely, the materials of the readout layer 3 and the auxiliary recording layer 5 are interchangeable.

Figure 7:
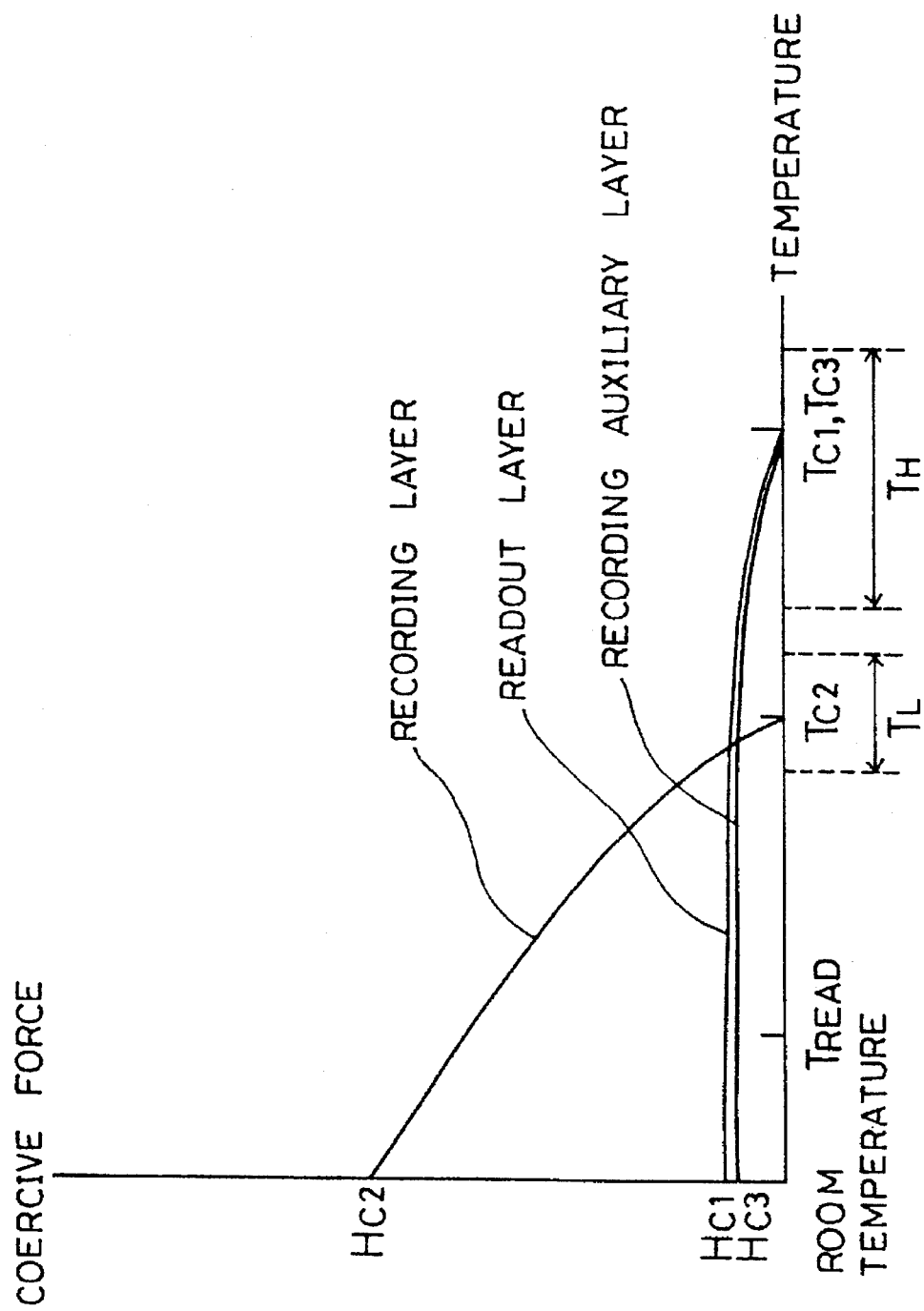
Figure 8:
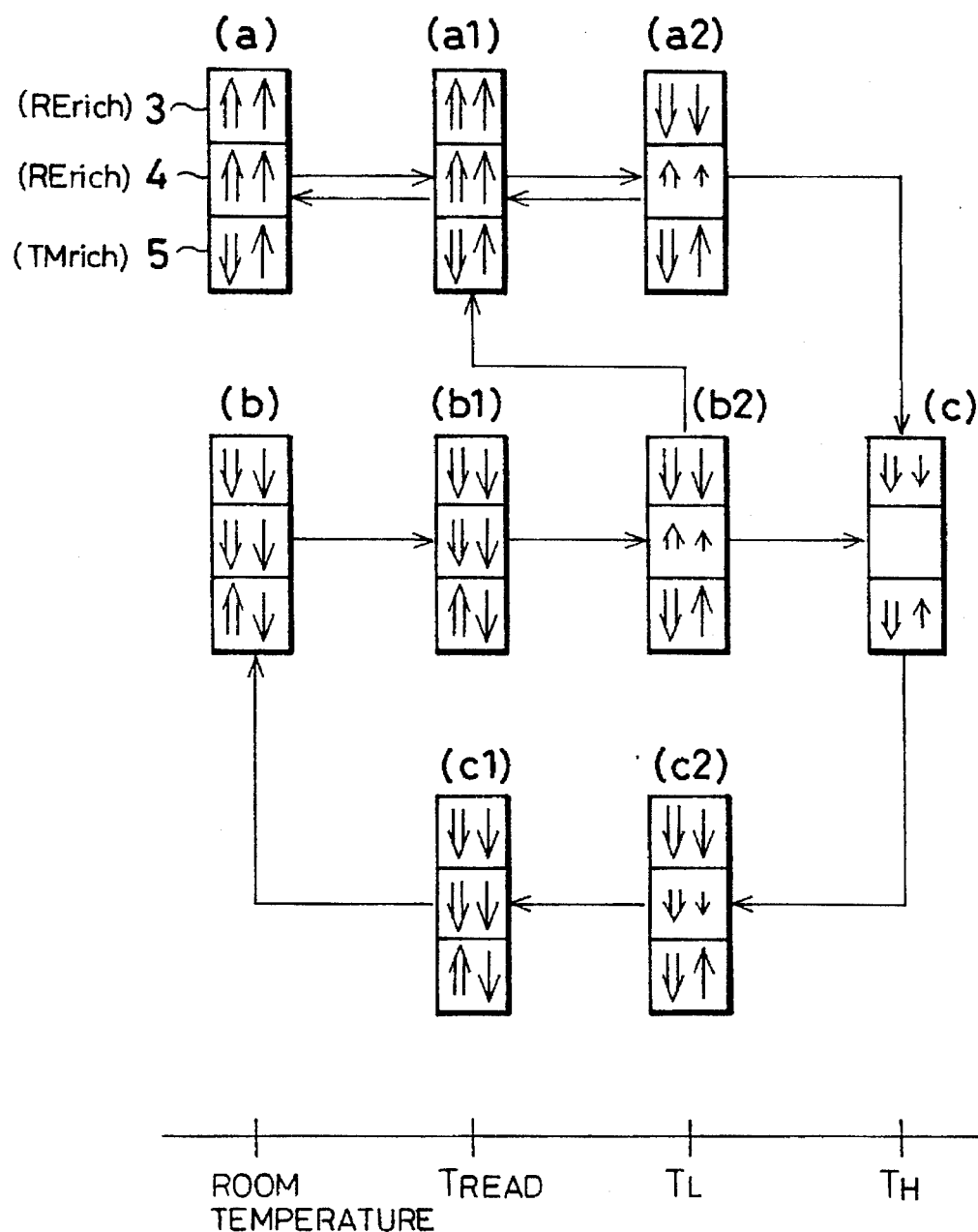

It is also possible to perform the reproduction of information and the light-intensity modulation overwriting through the process shown in FIG. 8 using a magneto-optical disk having the RE-rich readout layer 3, the RE-rich recording layer 4 and the TM-rich auxiliary recording layer 5 whose coercive force individually shows the temperature dependence of FIG. 7.

Since this magneto-optical recording medium has the RE-rich recording layer 4, the sublattice magnetic moment of the rare-earth metal of the recording layer 4 is parallel to the magnetization thereof. Therefore, the direction of the magnetostatic coupling force exerted on the recording layer 4 by the uniform magnetic field $H_B$ is changed. A temperature distribution is observed in the direction of film thickness at $T_L$ and overwriting by light intensity modulation becomes available as like on the above-mentioned magneto-optical recording medium.

The following description discusses a magneto-optical disk including the readout layer 3, the recording layer 4, and the auxiliary recording layer 5 having magnetic properties shown in FIG. 7 as a second sample (#1-2) of the magneto-optical recording medium of this embodiment.

For the readout layer 3, a thin film of rare-earth transition metal alloy made of RE-rich GdFeCo with a thickness of 50 nm is formed. The composition of GdFeCo is $Gd_{0.26}(Fe_{0.82}Co_{0.18})_{0.74}$, and the Curie temperature thereof is around 300° C.

For the recording layer 4, a thin film of rare-earth transition metal alloy made of RE-rich DyFeCo with a thickness of 50 nm is-formed. The composition of DyFeCo is $Dy_{0.35}(Fe_{0.78}Co_{0.22})_{0.65}$, and the Curie temperature thereof is around 170° C.

For the auxiliary recording layer 5, a thin film of rare-earth transition metal alloy made of TM-rich GdFeCo with a thickness of 50 nm is formed. The composition of GdFeCo is $Gd_{0.17}(Fe_{0.82}Co_{0.18})_{0.83}$, and the Curie temperature thereof is around 320° C.

Except for these changes, the sample (#1-2) has the same structure as that of the sample (#1-1).

Recording and reproduction tests were conducted using the magneto-optical disk in the above-mentioned manner. According to the results, the feasibility of good light-intensity modulation overwriting was confirmed.

In the above explanation about the light-intensity modulation overwriting, the magneto-optical disk having the RE-rich readout layer 3, the RE-rich recording layer 4 and the TM-rich auxiliary recording layer 5 was discussed. However, it is also possible to use a magneto-optical disk having a TM-rich readout layer 3, the RE-rich recording layer 4 and a RE-rich auxiliary recording layer 5 when performing the reproduction of information and the light-intensity modulation overwriting. Namely, the materials of the readout layer 3 and the auxiliary recording layer 5 are interchangeable.

Figure 9:
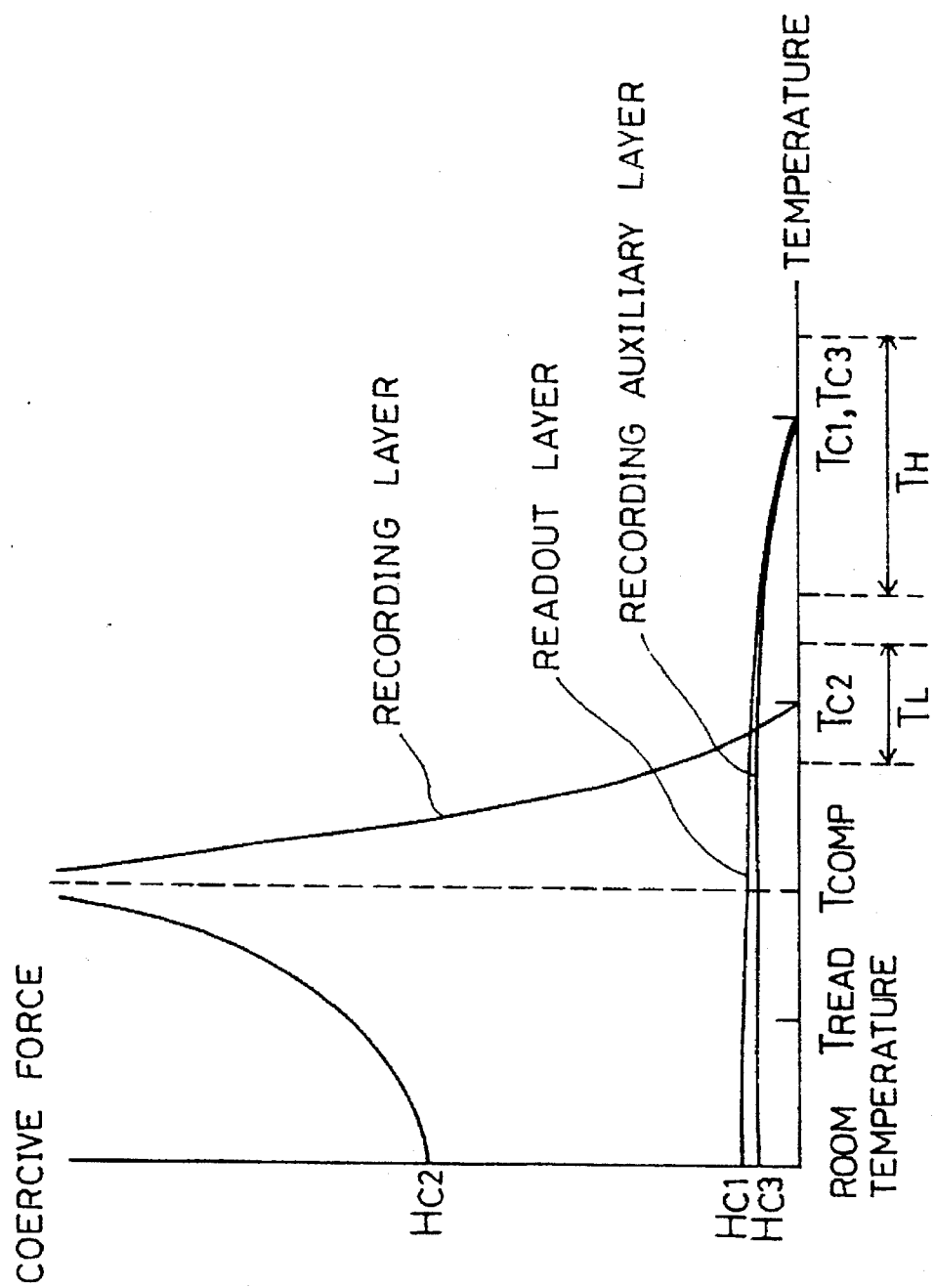
Figure 10:
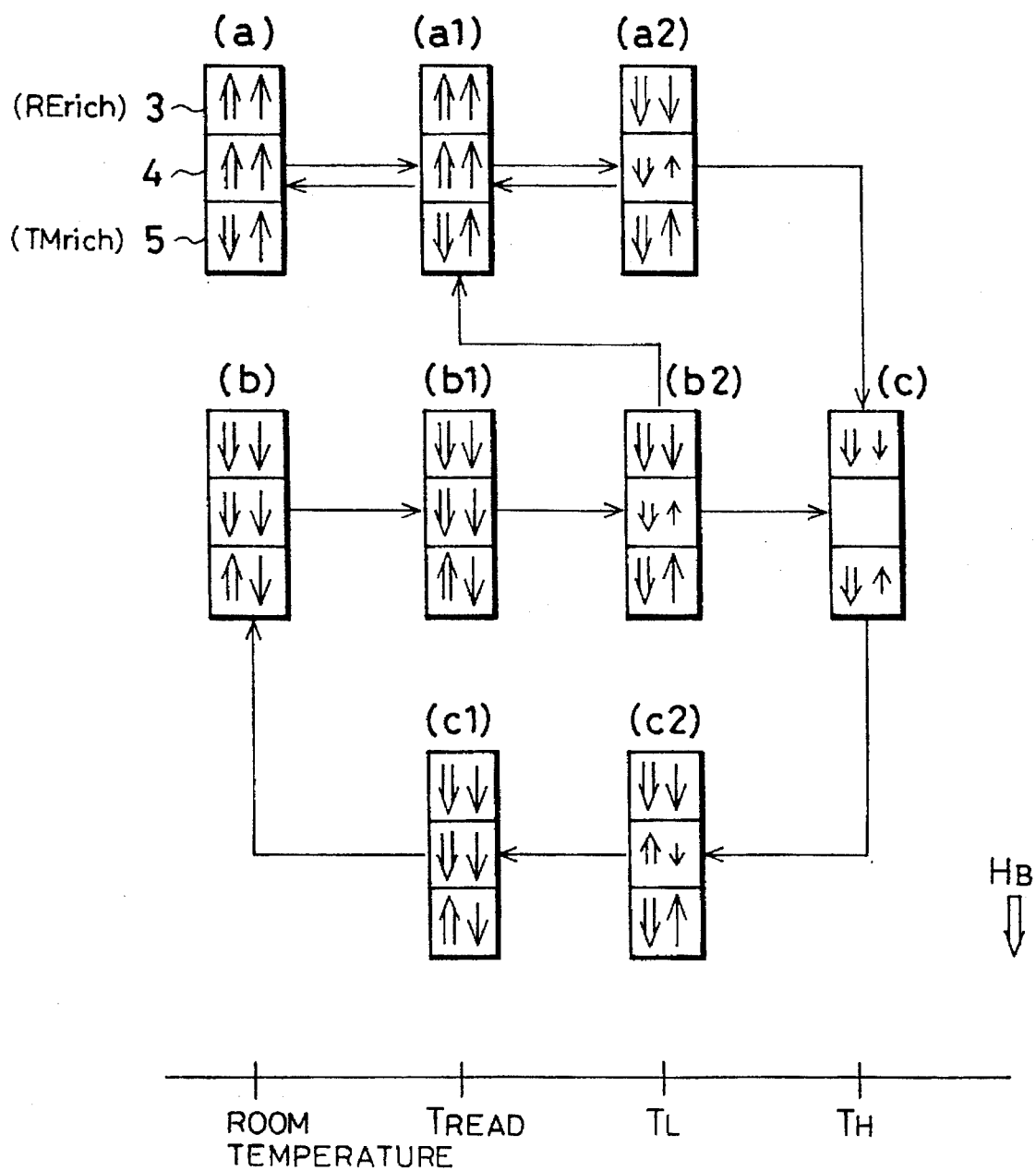

It is also possible to perform the reproduction of information and the light-intensity modulation overwriting through the process shown in FIG. 10 using a magneto-optical disk having the RE-rich readout layer 3, a recording layer 4 whose compensation temperature is $T_{COMP}$ and the TM-rich auxiliary recording layer 5, the coercive force of these layers individually showing the temperature dependence of FIG. 9.

With this magneto-optical disk, since the recording layer 4 has a compensation temperature $T_{COMP}$ between $T_{READ}$ and $T_L$, the magnetization of the recording layer 4 is reversed at temperatures around the compensation temperature $T_{COMP}$. However, states (a2), (b2) and (c2) at $T_L$ are equal to those of the above-mentioned magneto-optical recording medium. It is therefore possible to perform the light-intensity modulation overwriting in the above-mentioned manner.

Moreover, when the temperature of the recording layer 4 is decreased from $T_{C2}$, the coercive force rapidly increases as the temperature comes closer to the compensation temperature $T_{COMP}$. It is thus possible to perform more stable light-intensity modulation overwriting with the magneto-optical disk of this composition than with the above-mentioned magneto-optical recording medium.

The following description discusses a magneto-optical disk including the readout layer 3, the recording layer 4, and the auxiliary recording layer 5 having magnetic properties shown in FIG. 9 as a third sample (#1-3) of the magneto-optical recording medium of this embodiment.

For the readout layer 3, a thin film of rare-earth transition metal alloy made of RE-rich GdFeCo with a thickness of 50 nm was formed. The composition of GdFeCo is $Gd_{0.26}(Fe_{0.82}Co_{0.18})_{0.74}$, and the Curie temperature thereof is around 300° C.

For the recording layer 4, a thin film of rare-earth transition metal alloy made of DyFeCo with a thickness of 50 nm and the compensation temperature $T_{COMP}$ is formed. The composition of DyFeCo is $Dy_{0.25}(Fe_{0.78}Co_{0.22})_{0.75}$, and the Curie temperature thereof is around 190° C.

For the auxiliary recording layer 5, a thin film of rare-earth transition metal alloy made of TM-rich GdFeCo with a thickness of 50 nm is formed. The composition of GdFeCo is $Gd_{0.17}(Fe_{0.82}Co_{0.18})_{0.83}$, and the Curie temperature thereof is around 320° C.

Except for these changes, the sample (#1-3) has the same structure as that of the sample (#1-1).

Recording and reproduction tests were conducted using the magneto-optical disk in the above-mentioned manner. According to the results, the feasibility of good light-intensity modulation overwriting was confirmed.

In the above explanation about the light-intensity modulation overwriting, the magneto-optical disk having the RE-rich readout layer 3, the recording layer 4 having the compensation temperature $T_{COMP}$ and the TM-rich auxiliary recording layer 5 was discussed. However, it is also possible to use a magneto-optical disk having the TM-rich readout layer 3, the recording layer 4 having the compensation temperature $T_{COMP}$ and the RE-rich auxiliary recording layer 5 when performing the reproduction of information and the light-intensity modulation overwriting. Namely, the materials of the readout layer 3 and the auxiliary recording layer 5 are interchangeable.

The following description discusses the second embodiment of the present invention with reference to FIGS. 11 to 19. The members having the same function as in the above-mentioned embodiment will be designated by the same code and their description will be omitted.

Figure 11:
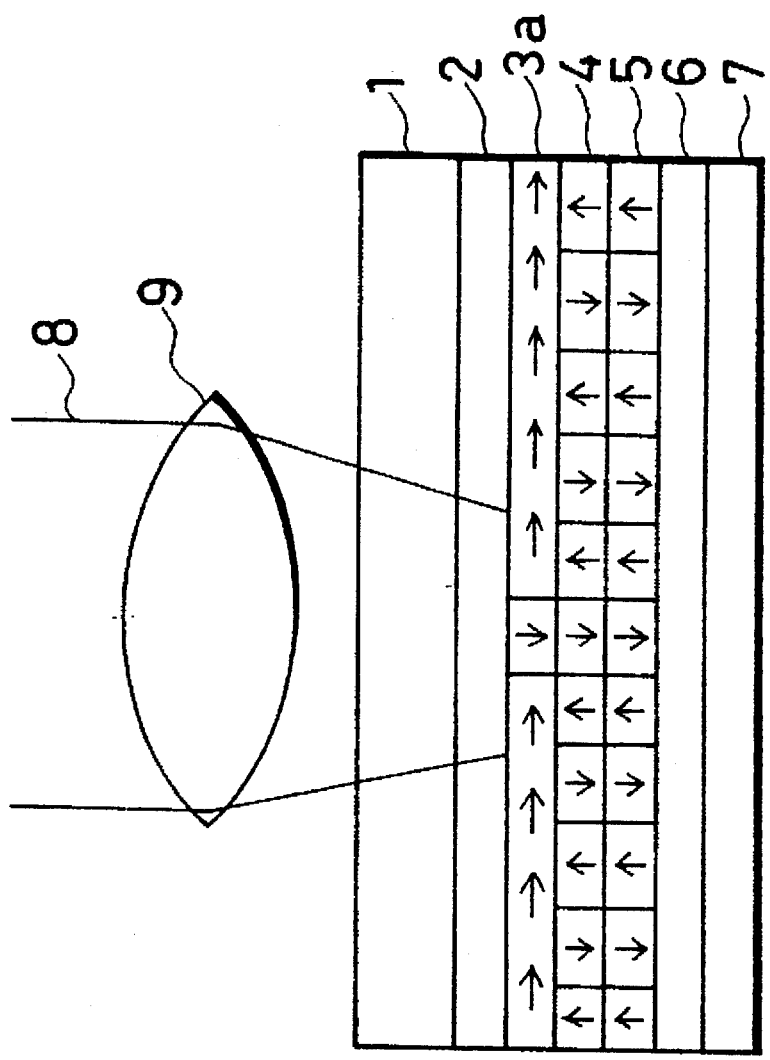
FIG. 11 through FIG. 19 show the second embodiment of the present invention.

As illustrated in FIG. 11, a magneto-optical recording medium of this embodiment is produced by forming the transparent dielectric layer 2, a readout layer 3a, the recording layer 4, the auxiliary recording layer 5, the protective film 6 and the overcoat film 7 in this order on the substrate 1. Recording and reproduction are performed by focusing laser light 8 on the readout layer 3a with a converging lens 9.

The readout layer 3a of this embodiment differs from that of the above-mentioned embodiment on the following point.

The readout layer 3a of this embodiment has in-plane magnetization at room temperature because in-plane magnetic anisotropy is larger than perpendicular magnetic anisotropy. With an increase of temperature, the perpendicular magnetic anisotropy becomes larger than the in-plane magnetic anisotropy and the readout layer 3a tends to have perpendicular magnetization.

An amorphous film formed by an alloy of rare-earth metal and transition metal is a ferrimagnetic material. The temperature dependence of the sublattice magnetic moment of the rare-earth metal and that of the transition metal are different from each other, and the latter becomes greater than the former at high temperatures. Then, in order to have in-plane magnetization at room temperature, RE-rich material is used for the readout layer 3a. When the temperature of the readout layer 3a is increased with the application of laser light 8, the sublattice magnetic moment of the rare-earth metal and that of the transition metal balance. This causes the readout layer 3a to have perpendicular magnetization. The temperature at which transition from in-plane magnetization to perpendicular magnetization occurs is referred to as $T_P$.

Figure 12:
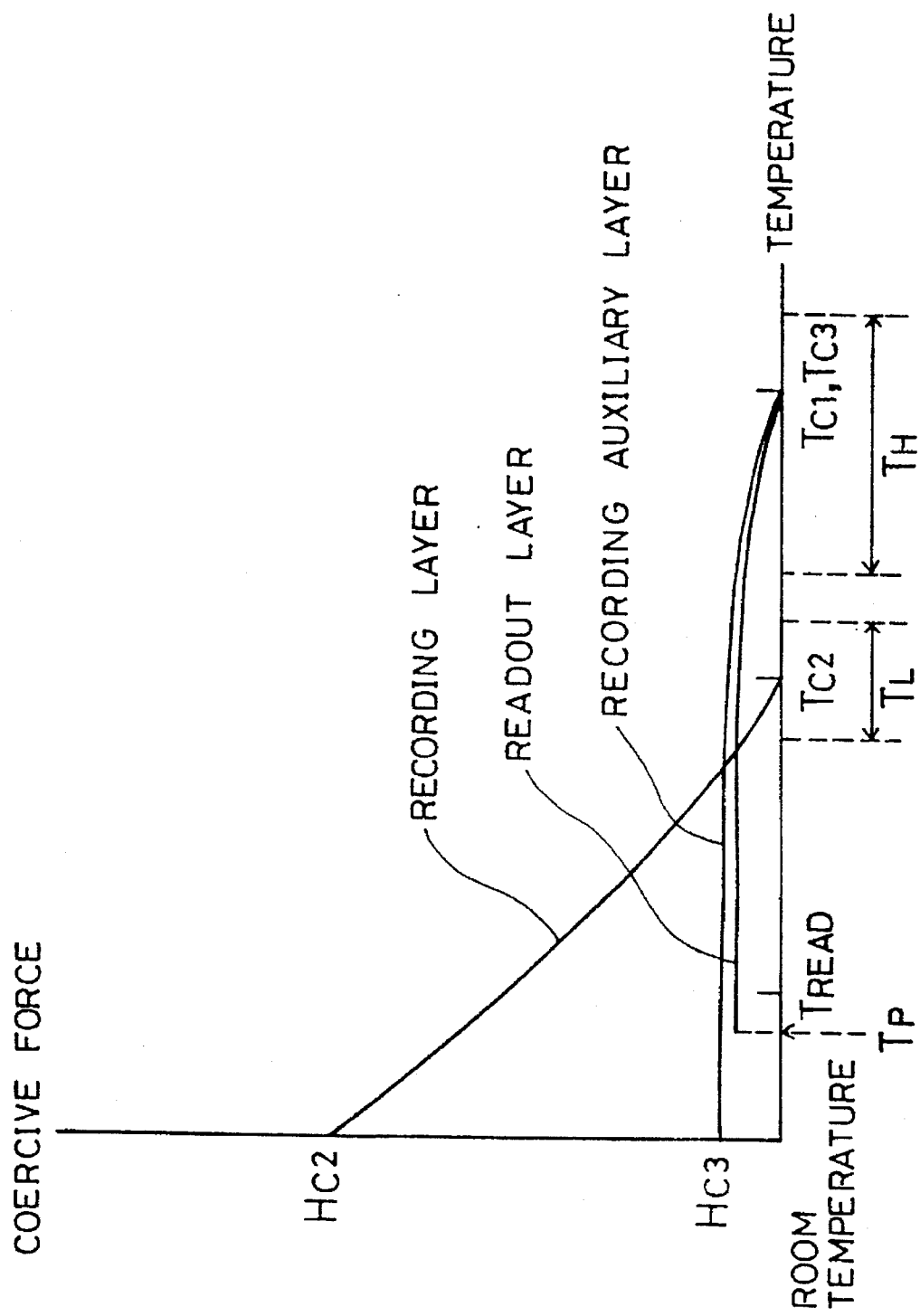
Figure 14:
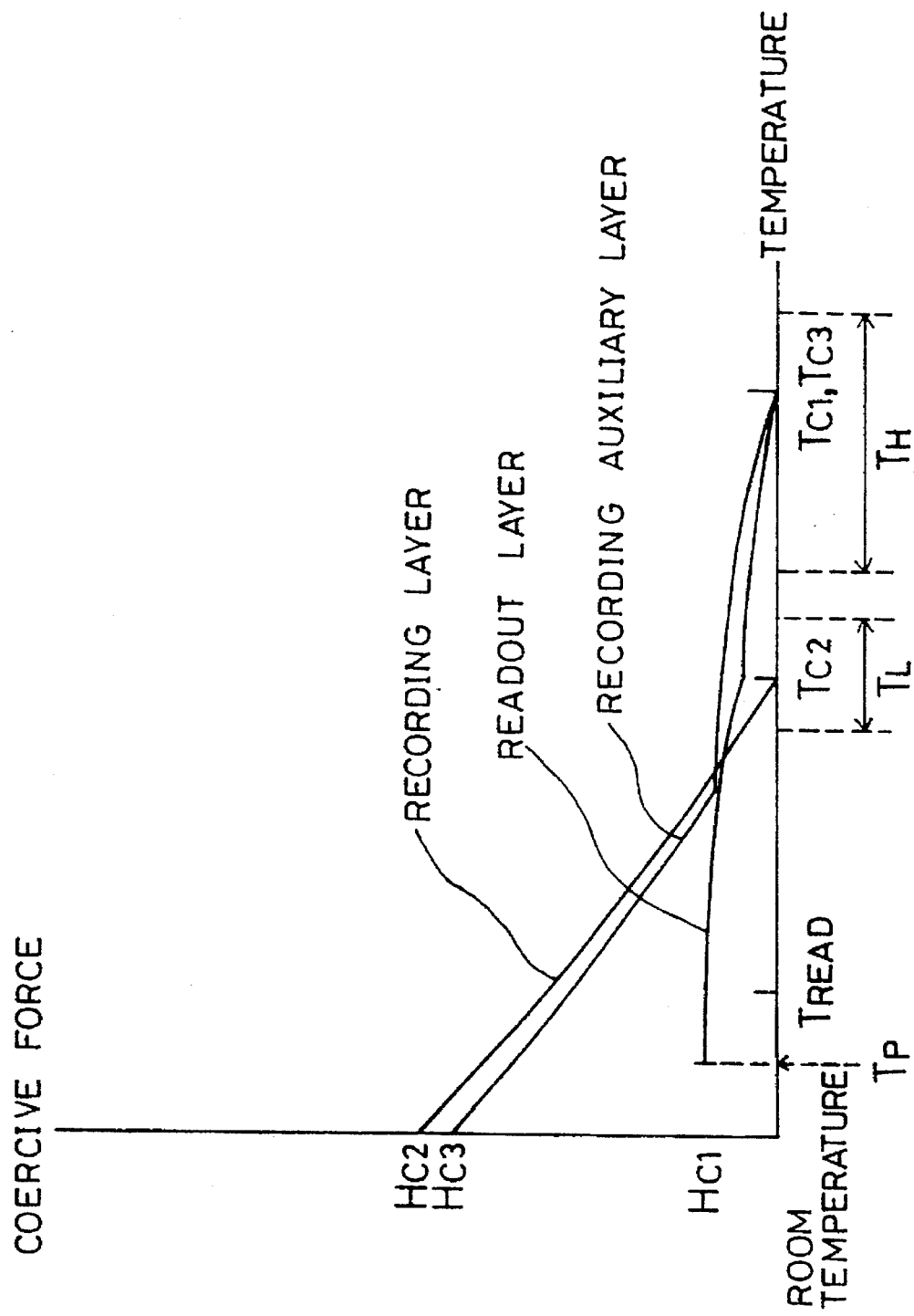

FIG. 12 shows the temperature dependence of coercive forces of the readout layer 3a, the recording layer 4 and the auxiliary recording layer 5. FIG. 14 shows the temperature dependence of coercive forces of these layers when they are formed on the substrate 1.

Figure 13:
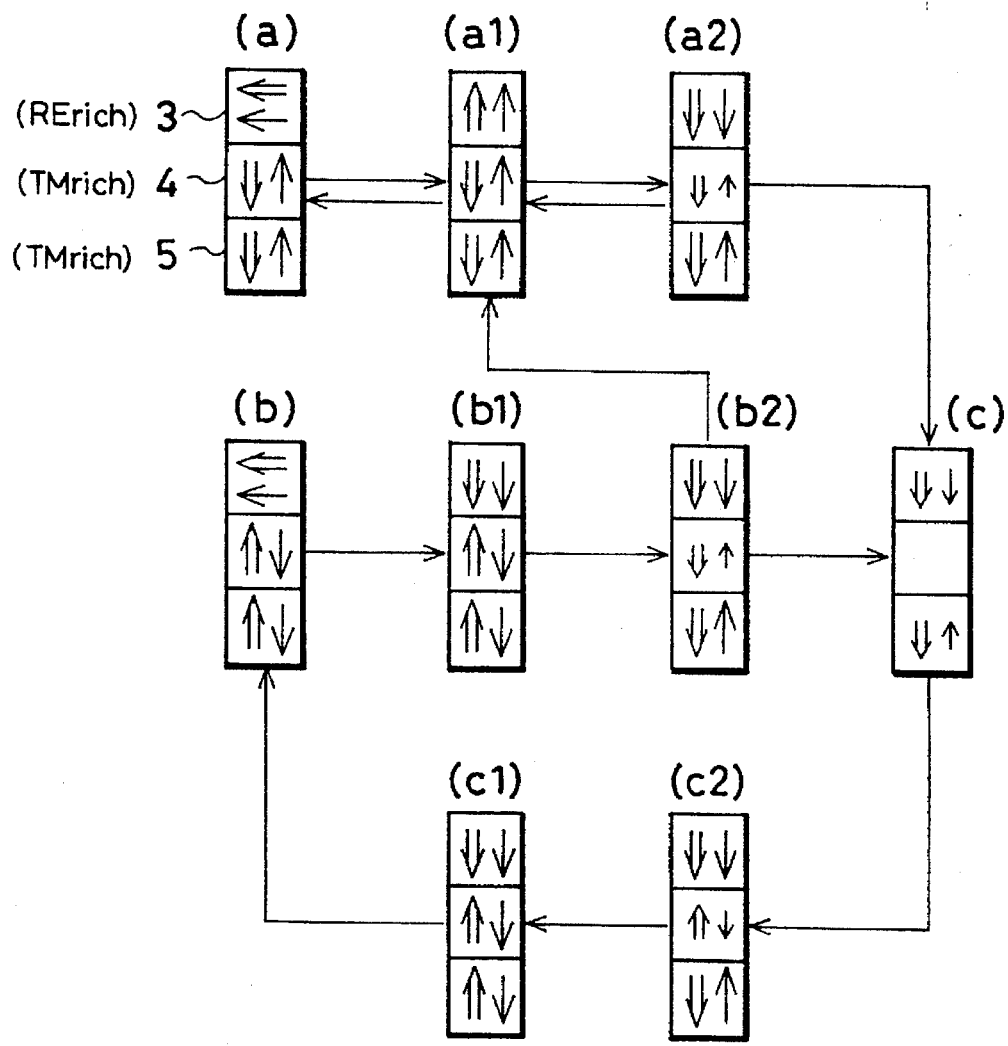

If the recording layer 4 and the auxiliary recording layer 5 are TM-rich, reproduction of information and light-intensity modulation overwriting are performed through the process shown in FIG. 13.

In states (a) and (b) at room temperature, the orientations of magnetization and the sublattice magnetic moment of the readout layer 3a are different from those of the above-mentioned embodiment (see FIG. 3). However, in states (a1), (a2), (b1), (b2), (c1) and (c2), they are the same as those of the above-mentioned embodiment. Like the above-mentioned embodiment, if the temperature of the recording medium is decreased to room temperature after projecting the laser light 8 of the first power, the states of the readout layer 3a change from (a) and (b) to (a). On the other hand, if the temperature of the recording medium is decreased to room temperature after projecting the laser light 8 of the second power, the states of the readout layers 3a change from (a) and (b) to (b). It is thus possible to perform light-intensity modulation overwriting.

When the readout layer 3a, the recording layer 4 and the auxiliary recording layer 5 are formed on the substrate 1 (see FIG. 14), an exchange coupling force is produced between the layers 3a and 4 and between layers 4 and 5. Therefore, if the magnetization of the recording layer 4 is finite (i.e., is not zero) or if the temperature of the recording layer 4 falls below $T_{C2}$, the coercive force of the readout layer 3a becomes greater than that of the readout layer 3a when used alone (see FIG. 12). Similarly, the coercive forces of the recording layer 4 and the auxiliary recording layer 5 become substantially equal to each other, or the coercive force of the auxiliary recording layer 5 becomes slightly smaller than that of the recording layer 4.

Figure 15:
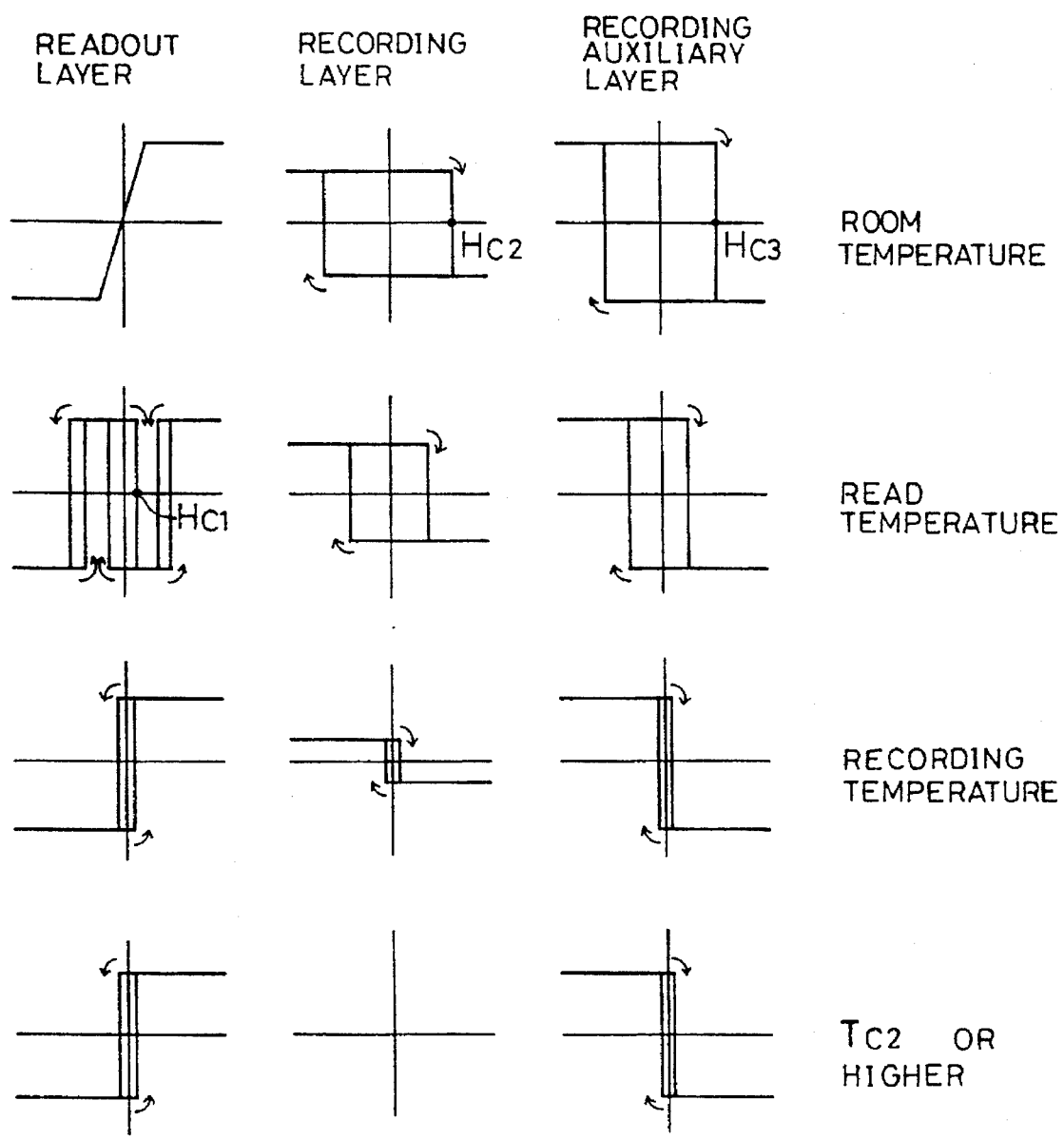

Moreover, when the readout layer 3a, the recording layer 4 and the auxiliary recording layer 5 are formed on the substrate 1, the readout layer 3a shows abnormal hysteresis characteristics at $T_{READ}$ (reading temperature) at which the coercive force of the recording layer 4 is strong as shown in FIG. 15. Meanwhile, the recording layer 4 and the auxiliary recording layer 5 show normal hysteresis characteristics of a TM-rich magnetic substance. The temperature $T_P$ at which the readout layer 3a has perpendicular magnetization is lowered by the exchange coupling. It is therefore desirable to determine the composition of the readout layer 3a so that $T_P$ comes between the room temperature and $T_{READ}$ when the readout layer 3a, the recording layer 4 and the auxiliary recording layer 5 are formed on the substrate 1.

The following description discusses the reproduction of information.

When the laser light 8 (see FIG. 11) which has passed through the substrate 1 is focused into a light spot on the readout layer 3a by the converging lens 9, the center part of a portion of the readout layer 3a exposed to the laser light 8 has the highest temperature. Since the laser light 8 is converged just before the limit of diffraction, the distribution of light intensity of the laser light 8 becomes Gaussian. Thus, the temperature distribution of the portion exposed to the laser light 8 also becomes Gaussian.

If the intensity of the laser light 8 is determined so that the center part of the portion exposed to the laser light 8 has a temperature not lower than $T_{READ}$ and that portions around the center part have temperatures not higher than $T_P$, only portions of the readout layer 3a having temperatures not lower than $T_P$ have transition from in-plane magnetization to perpendicular magnetization and portions having temperatures not higher than $T_P$ maintain in-plane magnetization. The direction of magnetization of the portions of readout layer 3a having perpendicular magnetization is aligned with that of the recording layer 4 due to exchange coupling forces between the readout layer 3a and the recording layer 4. When the laser light 8 is projected perpendicularly to the readout layer 3a, the polar Kerr effect is produced only on the portions having perpendicular magnetization, and therefore the effect is not produced in the portions having in-plane magnetization. It is therefore possible to reproduce only the information from the portions having temperatures not lower than $T_P$ with reflected light from the readout layer 3a.

When the laser light 8 and the magneto-optical recording medium are moved with respect to each other, the temperatures of the portions having temperatures not lower than $T_P$ are decreased and transition from perpendicular magnetization to in-plane magnetization occur. Consequently, the polar Kerr effect is not produced in the portions. This prevents the mixing of the signal from the portion exposed to the laser light 8 and signals from adjacent recording bits.

As described above, with the magneto-optical recording medium of this embodiment, it is possible to reproduce a recording bit smaller than the size of the light spot on the readout layer 3a and to prevent the mixing of the signal from the portion exposed to the laser light 8 and the signals from adjacent recording bits. As a result, the recording density is significantly improved.

The following description discusses a magneto-optical disk including the readout layer 3a, the recording layer 4 and the auxiliary recording layer 5 having magnetic properties of FIG. 12 as a first sample (#2-1) of the magneto-optical recording medium of this embodiment.

For the readout layer 3a, a thin film of rare-earth transition metal alloy made of RE-rich GdFeCo with a thickness of 50 nm is formed. The composition of GdFeCo is $Gd_{0.29}(Fe_{0.82}Co_{0.18})_{0.71}$, and the Curie temperature thereof is around 280° C.

For the recording layer 4, a thin film of rare-earth transition metal alloy made of TM-rich DyFeCo with a thickness of 50 nm is formed. The composition of DyFeCo is $Dy_{0.23}(Fe_{0.78}Co_{0.22})_{0.77}$, and the Curie temperature thereof is around 200° C.

For the auxiliary recording layer 5, a thin film of rare-earth transition metal alloy made of TM-rich GdFeCo with a thickness of 50 nm is formed on the recording layer 4. The composition of GdFeCo is $Gd_{0.17}(Fe_{0.82}Co_{0.18})_{0.83}$, and the Curie temperature thereof is around 320° C.

Except for these changes, this sample has the same structure as that of the first sample (#1-1) of the above-mentioned embodiment.

When the readout layer 3a, the recording layer 4 and the auxiliary recording layer 5 are laminated, the readout layer 3a substantially has in-plane magnetization at room temperature, and transition from in-plane magnetization to perpendicular magnetization occurs at temperatures 100° to 125° C.

The magneto-optical disk was rotated at a linear velocity of 10 m/s, and recording was performed by modulating the laser power at a frequency of 5 MHz while applying a uniform magnetic field $H_B$ of 25 kA/m. Here, the first laser power was set at 6 mW, and the second laser power was set at 10 mW. As a result, a magnetic domain whose magnetization is reversed every 1 µm was formed on the recording layer 4.

Next, the power of the laser light 8 was set at 2 mW, and the reproduction of information was carried out. As a result, a magneto-optical signal of 5 MHz corresponding to the reversal magnetic domain was obtained from the readout layer 3a.

Light-intensity modulation overwriting was performed on the reversal magnetic domain by modulating the laser power at a frequency of 10 MHz. As a result, the reversal magnetic domain disappears, and a reversal magnetic domain whose magnetization is reversed every 0.5 µm was formed on the recording layer 4.

Then, the power of the laser light 8 was set at 2 mW, and reproduction of information was carried out. As a result, a magneto-optical signal of 10 MHz corresponding to the reversal magnetic domain was obtained from the readout layer 3a.

The signal intensity of the 10 MHz magneto-optical signal is substantially equal to that of the 5 MHz magneto-optical signal. This indicates that the information was reproduced from a portion of the recording layer 4 corresponding to a portion of the readout layer 3a having perpendicular magnetization.

According to the results of experiments, the feasibility of good light-intensity modulation overwriting was confirmed.

In the above explanation about the light-intensity modulation overwriting and reproduction, the magneto-optical disk having the TM-rich recording layer 4 and the TM-rich auxiliary recording layer 5 was discussed. However, it is also possible to use a magneto-optical disk having the RE-rich recording layer 4 instead of the TM rich recording layer 4 when performing the reproduction of information and the light-intensity modulation overwriting through the process shown in FIG. 17, wherein the coercive forces of the readout layer 3a, the recording layer 4 and the auxiliary recording layer 5 individually show the temperature dependence of FIG. 16.

In this case, since the magneto-optical recording medium has the RE-rich recording layer 4, the sublattice magnetic moment of the rare-earth metal of the recording layer 4 is parallel to the magnetization. Therefore, the direction of magnetostatic coupling force exerted on the recording layer 4 by the uniform magnetic field $H_B$ is changed. However, by producing temperature distribution in the direction of film thickness at $T_L$, the light-intensity modulation overwriting is performed in the same manner as that performed using the above-mentioned magneto-optical recording medium. Moreover, since the coercive force is rapidly increased when the temperature of the recording layer 4 falls below $T_{C2}$, the light-intensity modulation overwriting using such a magneto-optical recording medium is more stable than that performed with the above-mentioned magneto-optical recording medium. As for reproduction, like the above-mentioned magneto-optical recording medium, it is possible to reproduce a recording bit smaller than the size of the light spot on the readout layer 3a and to prevent the mixing of the signal from the portion exposed to the laser light 8 and the signals from adjacent recording bits. As a result, the recording density is significantly improved.

Figure 16:
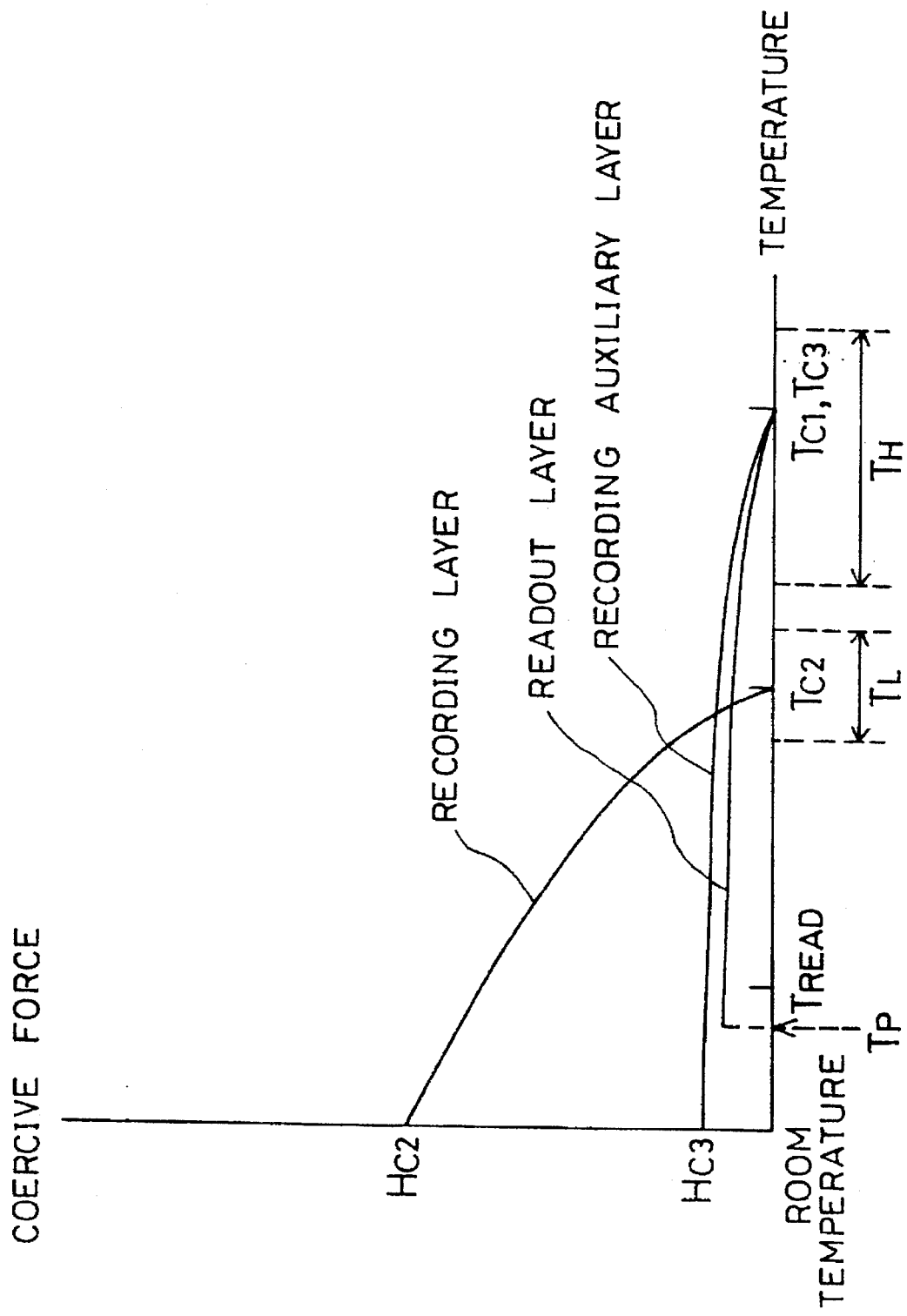
Figure 17:
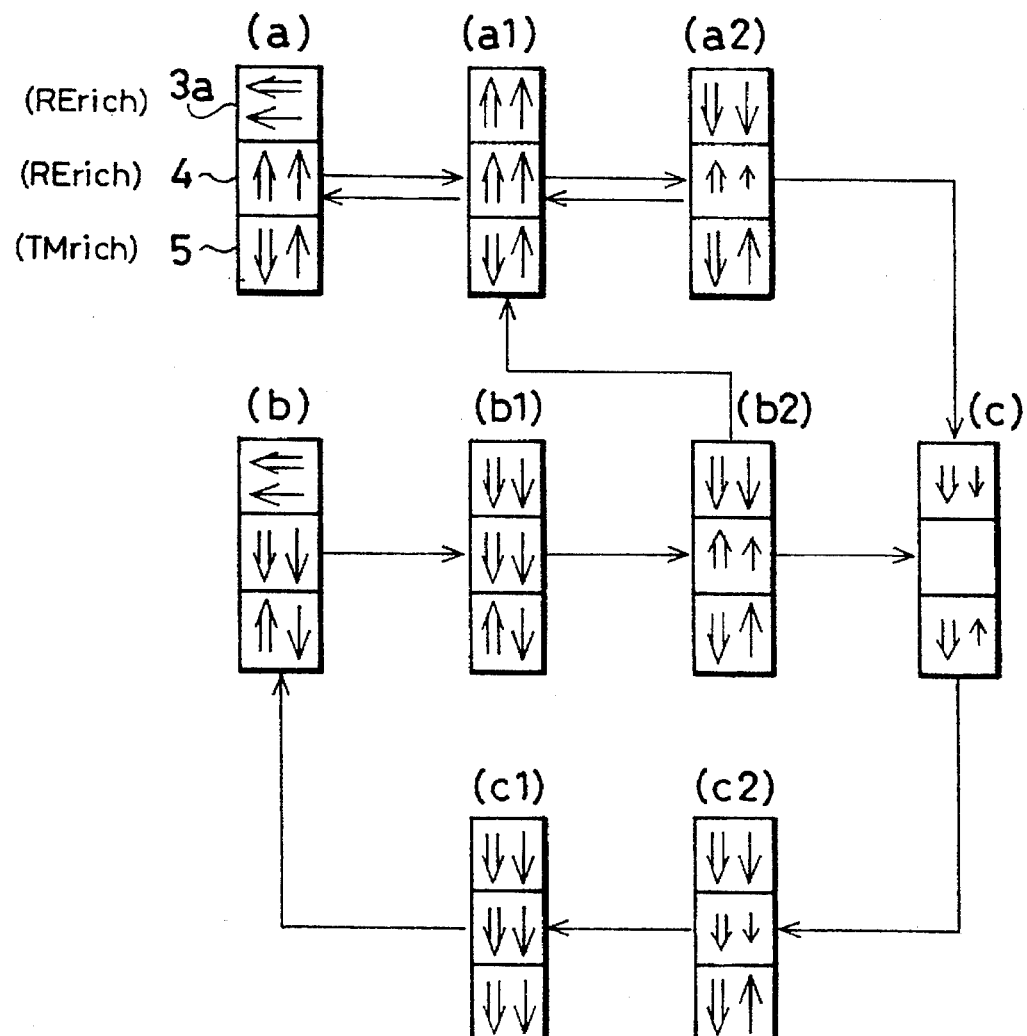

The following description discusses a magneto-optical disk including the readout layer 3a, the recording layer 4, and the auxiliary recording layer 5 having magnetic properties of FIG. 16 as a second sample (#2-2) of the magneto-optical recording medium of this embodiment.

For the readout layer 3a, a thin film of rare-earth transition metal alloy made of RE-rich GdFeCo with a thickness of 50 nm is formed. The composition of GdFeCo is $Gd_{0.29}(Fe_{0.82}Co_{0.18})_{0.71}$, and the Curie temperature thereof is around 280° C.

For the recording layer 4, a thin film of rare-earth transition metal alloy made of RE-rich DyFeCo with a thickness of 50 nm is formed. The composition of DyFeCo is $Dy_{0.35}(Fe_{0.78}Co_{0.22})_{0.65}$, and the Curie temperature thereof is around 170° C.

For the auxiliary recording layer 5, a thin film of rare-earth transition metal alloy made of TM-rich GdFeCo with a thickness of 50 nm is formed on the recording layer 4. The composition of GdFeCo is $Gd_{0.17}(Fe_{0.82}Co_{0.18})_{0.83}$, and the Curie temperature thereof is around 320° C.

When the readout layer 3a, the recording layer 4 and the auxiliary recording layer 5 are laminated, the readout layer 3a substantially has in-plane magnetization at room temperature, and transition from in-plane magnetization to perpendicular magnetization occurs at temperatures 100° to 125° C.

Except for these changes, this sample has the same structure as that of the sample (#2-1).

Recording and reproduction tests were conducted using the magneto-optical disk in the above-mentioned manner. According to the results, the feasibility of good light-intensity modulation overwriting was confirmed.

Figure 18:
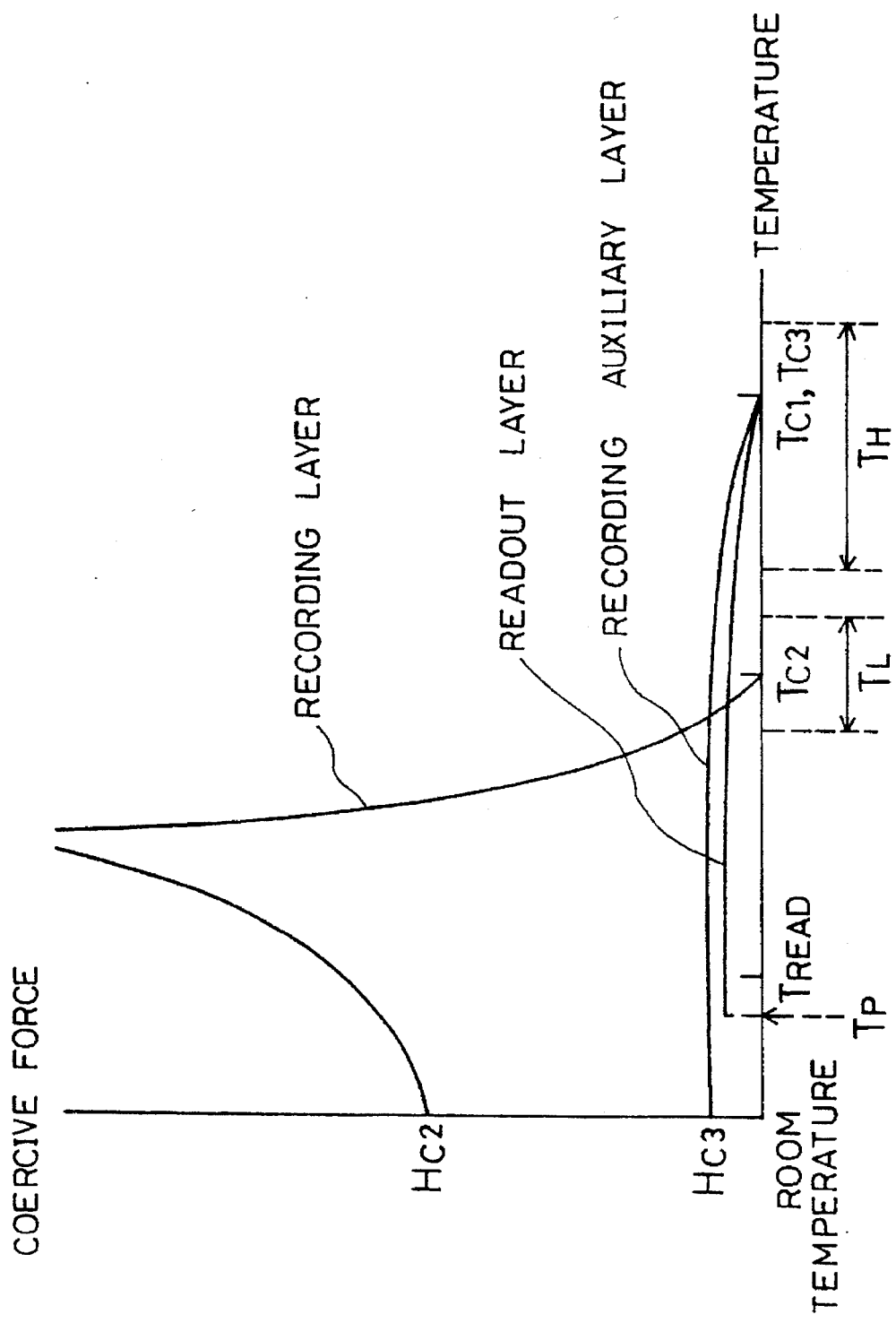
Figure 19:
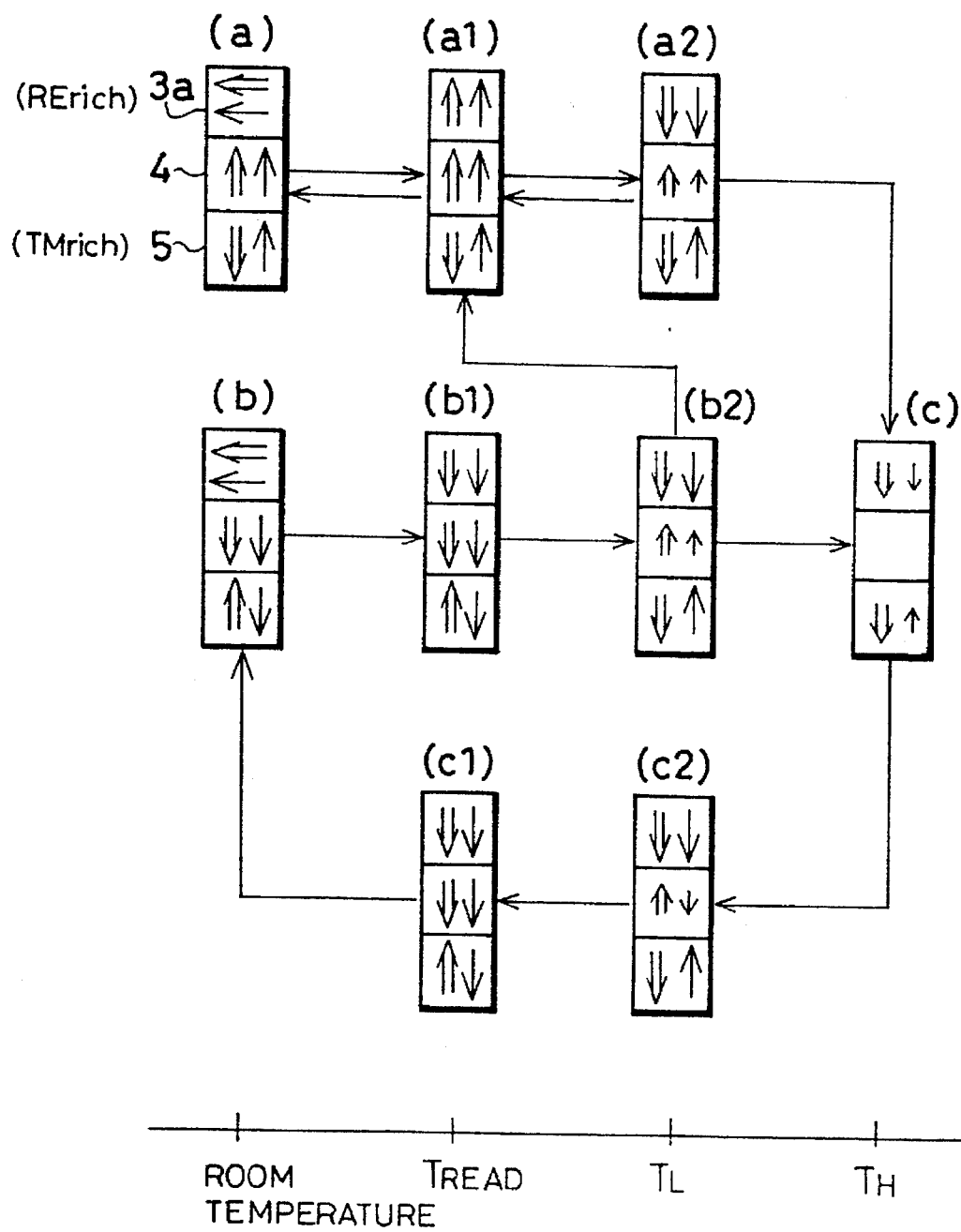

It is also possible to perform the reproduction of information and the light-intensity modulation overwriting through the process shown in FIG. 19 using a magneto-optical recording medium including the readout layer 3, the recording layer 4 having the compensation temperature $T_{COMP}$ and the auxiliary recording layer 5, the coercive forces of these layers individually showing the temperature dependence of FIG. 18.

In this case, since the recording layer 4 has the compensation temperature $T_{COMP}$ between $T_{READ}$ and $T_L$, the magnetization of the recording layer 4 is reversed at temperatures around the compensation temperature $T_{COMP}$. However, by producing temperature distribution in the direction of film thickness at $T_L$, the light-intensity modulation overwriting is performed in the same manner as that performed using the above-mentioned magneto-optical recording medium. Moreover, since the coercive force is rapidly increased when the temperature of the recording layer 4 falls below $T_{C2}$, the light-intensity modulation overwriting using such a magneto-optical recording medium is more stable than that performed with the above-mentioned magneto-optical recording medium. As for reproduction, like the above-mentioned magneto-optical recording medium, it is possible to reproduce a recording bit smaller than the size of the light spot on the readout layer 3a and to prevent the mixing of the signal from the portion exposed to the laser light 8 and the signals from adjacent recording bits. As a result, the recording density is significantly improved.

The following description discusses a magneto-optical disk including the readout layer 3a, the recording layer 4, and the auxiliary recording layer 5 having magnetic properties of FIG. 18 as a third sample (#2-3) of the magneto-optical recording medium of this embodiment. For the readout layer 3a, a thin film of rare-earth transition metal alloy made of RE-rich GdFeCo with a thickness of 50 nm is formed. The composition of GdFeCo is $Gd_{0.29}(Fe_{0.82}Co_{0.18})_{0.71}$, and the Curie temperature thereof is around 280° C.

For the recording layer 4, a thin film of rare-earth transition metal alloy made of DyFeCo with a thickness of 50 nm and the compensation temperature $T_{COMP}$ is formed. The composition of DyFeCo is $Dy_{0.25}(Fe_{0.78}Co_{0.22})_{0.75}$, and the Curie temperature thereof is around 190° C.

For the auxiliary recording layer 5, a thin film of rare-earth transition metal alloy made of TM-rich GdFeCo with a thickness of 50 nm is formed. The composition of GdFeCo is $Gd_{0.17}(Fe_{0.82}Co_{0.18})_{0.83}$, and the Curie temperature thereof is around 320° C.

When the readout layer 3a, the recording layer 4 and the auxiliary recording layer 5 are laminated, the readout layer 3a substantially has in-plane magnetization at room temperature, and transition from in-plane magnetization to perpendicular magnetization occurs at temperatures 100° to 125° C.

Except for these changes, this sample has the same structure as that of the sample (#2-1).

Recording and reproduction tests were conducted using the magneto-optical disk in the above-mentioned manner. According to the results,.the feasibility of satisfactory light-intensity modulation overwriting and and reproducing high dense information was confirmed.

Figure 20:
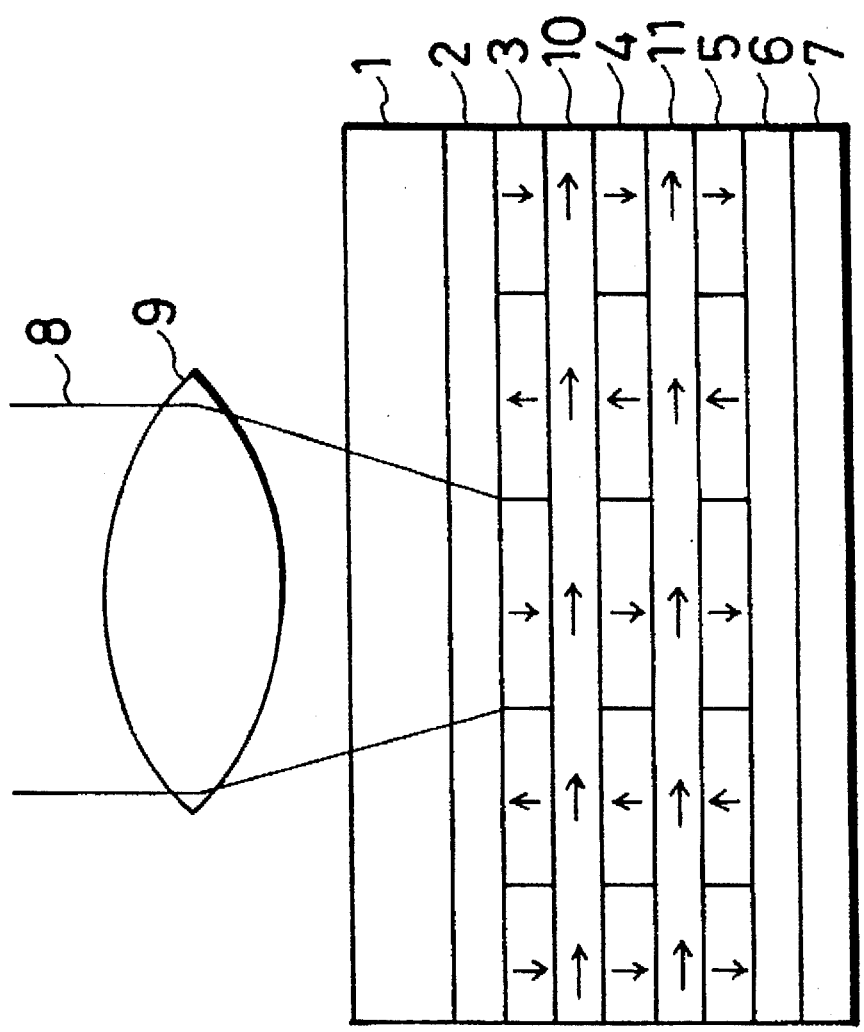
FIG. 20 shows a schematic structure of a magneto-optical recording medium according to the third embodiment of the present invention.

The following description discusses a third embodiment of the present invention with reference to FIG. 20. The members having the same function as in the above-mentioned embodiment will be designated by the same code and their description will be omitted.

As illustrated in FIG. 20, a magneto-optical recording medium of this embodiment is produced by forming the transparent dielectric layer 2, the readout layer 3, an intermediate layer 10, the recording layer 4, an intermediate layer 11, the auxiliary recording layer 5, the protective film 6 and the overcoat film 7 in this order on the substrate 1.

The inclusion of the intermediate layer 10 makes it possible to control the exchange force between the readout layer 3 and the recording layer 4. With this structure, a magneto-optical recording medium allowing the light-intensity modulation overwriting is easily achieved.

The inclusion of the intermediate layer 11 makes it possible to control the exchange force between the recording layer 4 and the auxiliary recording layer 5. With this structure, a magneto-optical recording medium allowing the light-intensity modulation overwriting is easily achieved.

The following description discusses a magneto-optical disk including the intermediate layer 10 between the readout layer 3 and the recording layer 4 as a first sample (#3-1) of the magneto-optical recording medium of this embodiment.

For the intermediate layer 10, FeCo as a film having in-plane magnetization is formed with a thickness of 2 nm. The composition of FeCo is $Fe_{0.8}Co_{0.2}$.

Except for the intermediate layer 10, this sample has the same structure as that of the first sample (#1-1) of the first embodiment.

Recording and reproduction tests were conducted using the magneto-optical disk in the above-mentioned manner. According to the results, the feasibility of good light-intensity modulation overwriting was confirmed. Since the intermediate layer 10 is included, the optimum value of the recording magnetic field $H_B$ became 30 kA/m.

Next, a magneto-optical disk including the intermediate layer 11 between the recording layer 4 and the auxiliary recording layer 5 is explained as a second sample (#3-2) of the magneto-optical recording medium of this embodiment.

For the intermediate layer 11, FeCo as a film having in-plane magnetization is formed with a thickness of 2 nm. The composition of FeCo is $Fe_{0.8}Co_{0.2}$.

Except for the intermediate layer 11, this sample has the same structure as that of the above-mentioned first sample (#1-1).

Recording and reproduction tests were conducted using the magneto-optical disk in the above-mentioned manner. According to the results, the feasibility of good light-intensity modulation overwriting was confirmed. Since the intermediate layer 11 is included, the optimum value of the recording magnetic filed $H_B$ became 20 kA/m.

Next, a magneto-optical disk including the intermediate layers 10 and 11 is explained as a third sample (#3-3) of the magneto-optical recording medium of this embodiment.

For the intermediate layers 10 and 11, FeCo as a film having in-plane magnetization is formed with a thickness of 2 nm. The composition of FeCo is $Fe_{0.8}Co_{0.2}$.

Except for the intermediate layers 10 and 11, this sample has the same structure as that of the above-mentioned first sample (#1-1).

Recording and reproduction tests were conducted using the magneto-optical disk in the above-mentioned manner. According to the results, the feasibility of good light-intensity modulation overwriting was confirmed. Since the intermediate layers 10 and 11 were included, the optimum value of the recording magnetic filed $H_B$ became 25 kA/m.

Figure 21:
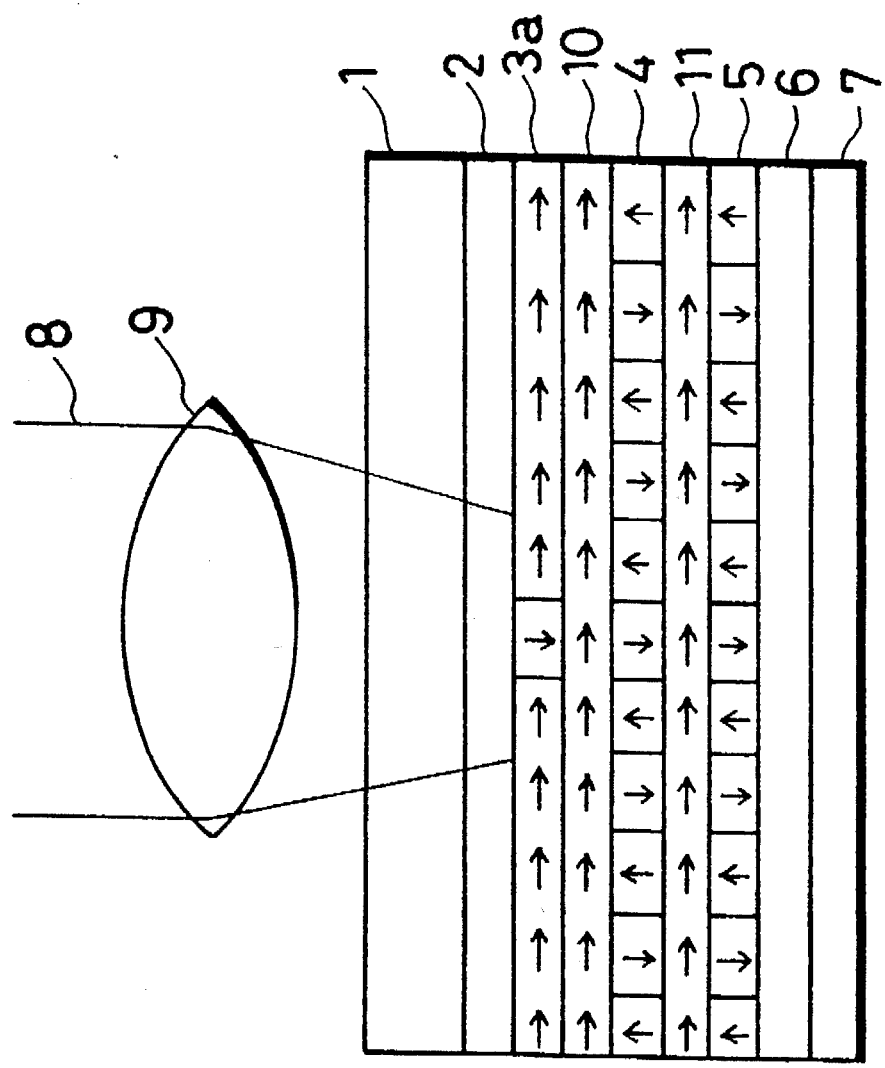
FIG. 21 through FIG. 31 show the fourth embodiment of the present invention.

The following description discusses a fourth embodiment of the present invention with reference to FIG. 21. The members having the same function as in the above-mentioned embodiment will be designated by the same code and their description will be omitted.

As illustrated in FIG. 21, a magneto-optical recording medium of this embodiment was produced by forming the transparent dielectric layer 2, the readout layer 3a, an intermediate layer 10, the recording layer 4, an intermediate layer 11, the auxiliary recording layer 5, the protective film 6 and the overcoat film 7 in this order on the substrate 1. The intermediate layer 10 made of a film having in-plane magnetization of the second embodiment was formed between the readout layer 3a and the recording layer 4, and the intermediate layer 11 made of a film having in-plane magnetization film was formed between the recording layer 4 and the auxiliary recording layer 5.

The inclusion of the intermediate layer 10 makes it possible to control the exchange coupling force between the readout layer 3a and the recording layer 4. With this structure, a magneto-optical recording medium allowing the light-intensity modulation overwriting is easily achieved.

Also, the inclusion of the intermediate layer 11 makes it possible to control the exchange coupling force between the recording layer 4 and the auxiliary recording layer 5. With this structure, a magneto-optical recording medium allowing the light-intensity modulation overwriting is easily achieved.

The following description discusses a magneto-optical disk including the intermediate layer 10 between the readout layer 3a and -the recording layer 4 as a first sample (#4-1) of the magneto-optical recording medium of this embodiment.

For the intermediate layer 10, FeCo as a film having in-plane magnetization film was formed with a thickness of 2 nm. The composition of FeCo is $Fe_{0.8}Co_{0.2}$.

Except for the intermediate layer 10, this sample has the same structure as that of the first sample (#2-1) of the second embodiment.

Recording and reproduction tests were conducted using the magneto-optical disk in the above-mentioned manner. According to the results, the feasibility of good light-intensity modulation overwriting was confirmed. Since the intermediate layer 10 was included, the optimum value of the recording magnetic filed $H_B$ became 30 kA/m.

Next, a magneto-optical disk including the intermediate layer 11 between the recording layer 4 and the auxiliary recording layer 5 is explained as a second sample (#4-2) of the magneto-optical recording medium of this embodiment.

For the intermediate layer 11, FeCo as a film having in-plane magnetization was formed with a thickness of 2 nm. The composition of FeCo is $Fe_{0.8}Co_{0.2}$.

Except for the intermediate layer 11, this sample has the same structure as that of the above-mentioned sample (#2-1).

Recording and reproduction tests were conducted using the magneto-optical disk in the above-mentioned manner. According to the results, the feasibility of good light-intensity modulation overwriting was confirmed. Since the intermediate layer 11 was included, the optimum value of the recording magnetic filed $H_B$ became 20 kA/m.

Next, a magneto-optical disk including the intermediate layers 10 and 11 is explained as a third sample (#4-3) of the magneto-optical recording medium of this embodiment.

For the intermediate layers 10 and 11, FeCo as a film having in-plane magnetization was formed with a thickness of 2 nm. The composition of FeCo is $Fe_{0.8}Co_{0.2}$.

Except for the intermediate layers 10 and 11, this sample has the same structure as that of the above-mentioned sample (#2-1).

Recording and reproduction tests were conducted using the magneto-optical disk in the above-mentioned manner. According to the results, the feasibility of good light-intensity modulation overwriting was confirmed. Since the intermediate layers 10 and 11 were included, the optimum value of the recording magnetic filed $H_B$ became 25 kA/m.

The following description discusses the components of the magneto-optical recording media of the first to fourth embodiments.

The composition of GdFeCo of the readout layer 3 is not restricted to $Gd_{0.26}(Fe_{0.82}Co_{0.18})_{0.74}$. Similarly, the composition of the readout layer 3a is not restricted to $Gd_{0.29}(Fe_{0.82}Co_{0.18})_{0.71}$. The conditions to be satisfied by the readout layers 3 and 3a are that the sublattice magnetic moments of the readout layers 3 and 3a become antiparallel to the sublattice magnetic moment of the auxiliary recording layer 5 in the vicinity of the Curie temperature $T_{C2}$ of the recording layer 4, the readout layer 3 has perpendicular magnetization up to the Curie temperature $T_{C1}$ and that the readout layer 3a has in-plane magnetization at room temperature and perpendicular magnetization at temperatures above the room temperature.

It is not necessary that the readout layer 3a has perfect in-plane magnetization at room temperature nor shows transition from in-plane magnetization to perfect perpendicular magnetization at temperatures above room temperature. The requirement for the readout layer 3a is that the direction of magnetization at room temperature differs from the direction of magnetization at $T_{READ}$.

As for the rare-earth transition metal alloy, by varying the ratio of the rare-earth metal to the transition metal, the compensation temperature at which the magnetization of the rare-earth metal and that of the transition metal balance is varied. Since GdFeCo is a material series which has perpendicular magnetization at temperatures in the vicinity of the compensation temperature, a material satisfying the above-mentioned conditions is obtained by changing the ratio of Gd to FeCo.

Figure 22:
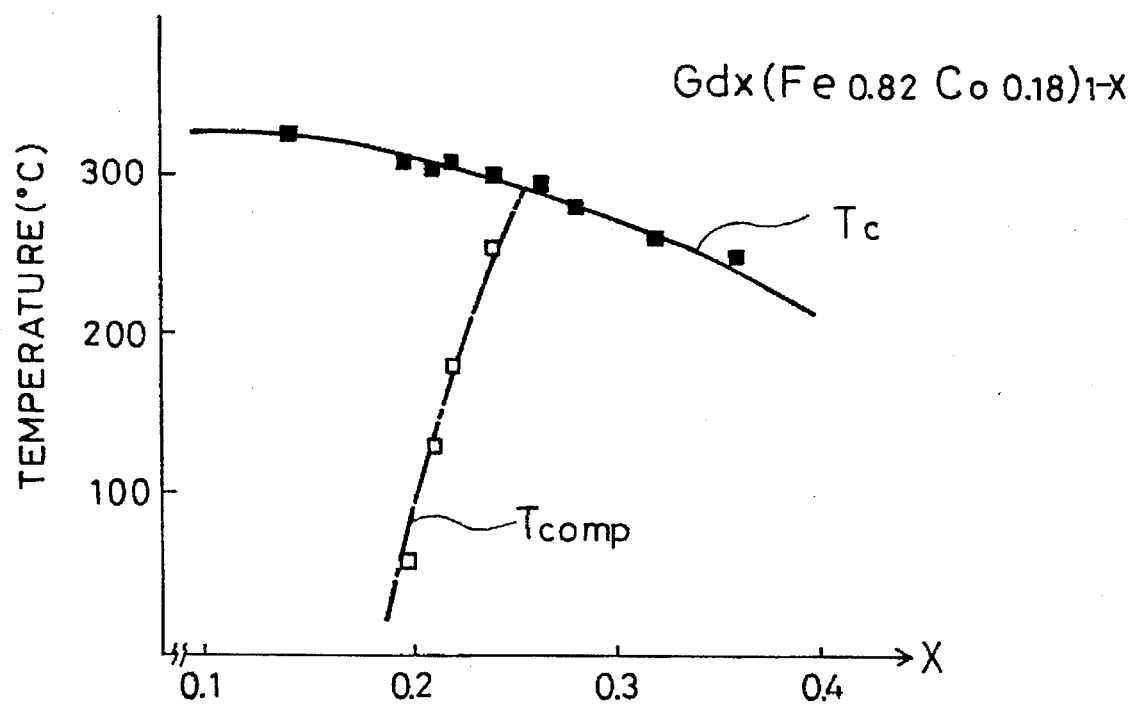

FIG. 22 shows experimental results of compensation temperature and Curie temperature with a variable X in $Gd_x(Fe_{0.82}Co_{0.18})_{1-x}$, i.e., when the composition of Gd was varied.

It is found that a material satisfying the conditions for the readout layer 3 is obtained by setting $0.20 < X < 0.27$. Also, a material satisfying the conditions for the readout layer 3a is obtained by setting $0.27 \leq X < 0.32$.

The range of X mentioned is effective only when a TM-rich material is used as the auxiliary recording layer 5 and $Dy_{0.23}(Fe_{0.82}Co_{0.18})_{0.77}$ having a film thickness of 50 nm is used as the recording layer 4. The magnetic properties of the recording layer 3 or 3a are changed by the magnetic properties of the recording layer 4. It is therefore desirable to determine the material of the readout layer 3 or 3a by taking account of the recording layer 4.

As for the readout layer 3 or 3a, it is possible to use an amorphous film made of an alloy of rare-earth transition metal such as GdFe, GdCo, GdTbFeCo, GdDyFeCo, NdGdFe, NdGdCo, NdGdTbFeCo and NdGdDyFeCo as well as GdFeCo.

Additionally, when the wavelength of the semiconductor laser as a light source of an optical pickup becomes less than 780 nm, a material which has a large Kerr polar rotation angle at the wavelength is also suitable for the readout layer 3 or 3a.

As explained earlier, in the magneto-optical recording medium such as the magneto-optical disk, the recording density is limited by the size of the light spot which is determined by the wavelength of the laser light and the aperture of the converging lens 9. Namely, the recording density on the magneto-optical disk is improved by using a semiconductor laser with a shorter wavelength. At present, the semiconductor laser with a wavelength of 670 nm to 680 nm has been in practical use, and SHG laser with a wavelength equal to or below 400 nm has been earnestly studied.

The Kerr polar rotation angle of the rare-earth transition metal alloy has a wavelength dependence. In general, as the wavelength becomes shorter, the Kerr polar rotation angle becomes smaller. Therefore, with the use of the film which has a large Kerr polar rotation angle at a short wavelength, the signal intensity is increased, thereby achieving a high quality reproduced signal.

By adding a very small amount of at least one element selected from the group consisting of Nd, Pt, Pr and Pd to the above material for the readout layer 3 or 3a, the greater Kerr polar rotation angle is achieved at a short wavelength while substantially maintaining the properties required for the readout layer 3 or 3a. It is thus possible to provide a magneto-optical recording medium which permits a high quality reproduced signal even when the semiconductor laser with a short wavelength is used.

Moreover, by adding a very small amount of at least one element selected from the group consisting of Cr, V, Nb, Mn, Be, and Ni to the above material for the readout layer 3 or 3a, the resistance of the readout layer 3 or 3a to environmental conditions is improved. It is thus possible to prevent the properties of the readout layer 3 or 3a from deteriorating by protecting it against oxidization caused by moisture and oxygen and to provide a magneto-optical recording medium having prominent reliability for a long time.

In the above-mentioned embodiments, although the recording layer 3 or 3a was formed with a film thickness of 50 nm, the film thickness can be varied.

In order to produce exchange coupling forces between the readout layer 3 and the recording layer 4 during recording, it is desirable to produce the readout layer 3 having a thickness not smaller than 10 nm.

Additionally, in order to prevent the laser light 8 from passing through the readout layer 3a and reaching the recording layer 4 during reproduction, it is desirable to arrange the film thickness of the readout layer 3a to be not smaller than 20 nm and more preferably not smaller than 50 nm. On the other hand, in order to facilitate transferring of information from the recording layer 4 to the readout layer 3a, it is desirable to arrange the film thickness of the readout layer 3a to be not larger than 100 nm.

A material used for the recording layer 4 is needed to have perpendicular magnetization in a temperature range from room temperature to the Curie temperature $TC_2$. As for the Curie temperature, $T_{C2}$ suitable for recording is between 150° C. and 250° C. Materials suitable for the recording layer 4 are DyFeCo, TbFeCo, GdTbFe, NdDyFeCo, GdDyFeCo and GdTbFeCo.

Furthermore, by adding to the material for the recording layer 4 a very small amount of at least one element selected from the group consisting of Cr, V, Nb, Mn, Be and Ni, the long-time reliability of the recording layer 4 is improved. Although the film thickness of the recording layer 4 is determined by taking account of the material, composition and film thickness of the readout layer 3 or 3a, it is desirable to set the film thickness between about 20 nm and 100 nm.

Although the composition of GdFeCo of the auxiliary recording layer 5 is not restricted to $Gd_{0.17}(Fe_{0.82}Co_{0.18})_{0.83}$, it is needed to be determined such that the sublattice magnetic moment of the auxiliary recording layer 5 becomes antiparallel to the sublattice magnetic moments of the readout layers 3 and 3a at temperatures in the vicinity of the Curie temperature $T_{C2}$ of the recording layer 4. If the ratio of the rare-earth and the transition metal of the alloy of rare-earth transition metal is changed, the compensation temperature at which the magnetization of the rare-earth and that of the transition metal balance is varied. Since GdFeCo is a material series having perpendicular magnetization near the compensation temperature, a material satisfying the above-mentioned requirements is obtained by changing the ratio of Gd to FeCo.

FIG. 22 shows the results of an experiment which was conducted to examine the compensation temperature and the Curie temperature with a variable X in $Gd_x(Fe_{0.82}Co_{0.18})_{1-x}$, i.e., when the composition of Gd was varied.

When the RE-rich readout layer 3 or 3a is formed by a RE-rich material, the conditions for the auxiliary recording layer 5 are satisfied by setting X within a range 0.10<X<0.20.

For the auxiliary recording layer 5, it is possible to use an amorphous film made of an alloy of rare-earth transition metal such as GdFe, GdCo, GdTbFeCo, GdDyFeCo, NdGdFe, NdGdCo, NdGdTbFeCo and NdGdDyFeCo as well as GdFeCo.

By adding a very small amount of at least one element selected from the group consisting of Cr, V, Nb, Mn, Be and Ni to the above material for the auxiliary recording layer 5, the resistance of the auxiliary recording 5 to environmental conditions is improved. It is thus possible to prevent the properties of the auxiliary recording layer 5 from deteriorating by protecting it against oxidization caused by moisture and oxygen and to provide a magneto-optical recording medium having long-time reliability.

In the above-mentioned embodiments, although the auxiliary recording 5 was formed with a film thickness of 50 nm, the film thickness can be varied. In order to produce exchange coupling forces between the auxiliary recording layer 5 and the recording layer 4 during recording, it is desirable to produce the auxiliary recording layer 5 having a thickness not smaller than 10 nm.

Additionally, the film thickness of AlN of the transparent dielectric layer 2 is not restricted to 80 nm.

The film thickness of the transparent dielectric layer 2 is determined by taking account of the enhancement of Kerr effect which increases the polar Kerr rotation angle using interference of light from the readout layer 3 when reproducing information from the magneto-optical disk. During reproduction, in order to improve the signal quality (C/N) as much as possible, it is necessary to increase the polar Kerr rotation angle. Therefore, the film thickness of the transparent dielectric layer 2 is set to achieve the maximum polar Kerr rotation angle.

The film thickness is varied depending on the wavelength of the reproducing light and the refractive index of the transparent dielectric layer 2. In this embodiment, AlN whose refractive index is 2.0 is used with respect to the reproducing light of a wavelength of 780 nm. Thus, if the film thickness of AlN of the transparent dielectric layer 2 is substantially set between 30 nm and 120 nm, the Kerr effect is enhanced. A more preferable range of the film thickness of AlN of the transparent dielectric layer 2 is between 70 nm and 100 nm. Namely, if the film thickness of AlN is within this range, the polar Kerr rotation angle becomes almost maximum.

In the above explanation, the reproducing light with a wavelength of 780 nm is used. When reproducing light with a wavelength of 400 nm, for example, which is substantially a half of the above-mentioned wavelength 780 nm is used, the thickness of the transparent dielectric layer 2 is preferably set a half of the film thickness which is used with the reproducing light having a wavelength of 780 nm.

Additionally, when the refractive index of the transparent dielectric layer 2 changes depending on a material used in the transparent dielectric layer 2 or the method used in manufacturing the transparent dielectric layer 2, the thickness of the transparent dielectric layer 2 is adjusted so as to have a uniform value (=optical path length) which is obtained by multiplying the refractive index by the film thickness.

In this embodiment, 160 nm was obtained as the optical path length of the transparent dielectric layer 2 by multiplying 2 (the refractive index) by 80 nm (the film thickness). When the refractive index of AlN changes from 2 to 2.5, the film thickness is preferably set at 160 nm/2.5=64 nm.

As can be seen from the above explanation, the larger the refractive index of the transparent dielectric layer 2 becomes, the smaller the film thickness of the transparent dielectric layer 2 is. Also, the polar Kerr rotation angle is enhanced with an increase in the refractive index.

The refractive index of AlN changes with a change in the ratio of Ar to $N_2$ of sputtering gas used in sputtering, the gas pressure, etc. However, since AlN has relatively large refractive index of approximately 1.8 to 2.1, it is suitable for use as a material for the transparent dielectric layer 2.

Moreover, the transparent dielectric layer 2 has not only a function of enhancing the Kerr effect, but also a function of protecting the readout layer 3 or 3a and the recording layer 4 which are magnetic layers made of a rare-earth transition metal alloy against oxidization together with the protective film 6.

The magnetic film of rare-earth transition metal is oxidized easily, and especially rare-earth metal is very easily oxidized. Therefore, in order to prevent the deterioration of the properties of the layers, entering of oxygen and moisture from outside must be prevented.

Thus, in this embodiment, the readout layer 3 or 3a, the recording layer 4 and the auxiliary recording layer 5 are sandwiched between AlN films. The AlN films are nitrogen films which do not contain oxygen, and have high moisture resistance.

Furthermore, AlN has a relatively large refractive index of around 2, is transparent, and contains no oxygen. It is thus possible to provide a magneto-optical disk promising reliable performance for a long time. Additionally, with the use of an Al target, it is possible to perform a reactive DC (direct current) sputtering by introducing $N_2$ gas or mixed gas of Ar and $N_2$. With this sputtering method, a faster film forming speed is achieved compared with the RF (high frequency) sputtering method.

As for the materials for the transparent dielectric layer 2 other than AlN, the following materials which have relatively large refractive indexes are suitable: SiN, AlSiN, AlTaN, SiAlON, TiN, TiON, BN, ZnS, $TiO_2$, $BaTiO_3$ and $SrTiO_3$. In particular, since SiN, AlSiN, AlTiN, TiN, BN and ZnS do not contain oxygen, it is possible to provide a magneto-optical disk having an excellent moisture resistance.

SiN, AlSiN, AlTaN, SiAlON, TiN, TiON, BN, ZnS, $TiO_2$, $BaTiO_3$, $SrTiO_3$ are formed by sputtering. AlSiN, AlTaN, TiN and $TiO_2$ permit the reactive DC sputtering which is superior to the RF sputtering in terms of the film forming speed. The refractive index of SiN, AlSiN, AlTaN, BN and of SiAlON are in the range of 1.8 to 2.1. The refractive index of TiN is in the range of 2 to 2.4. The refractive index of ZnS and of TiON are in the range of 2 to 2.5. The refractive index of $TiO_2$, $BaTiO_3$ and of $SrTiO_3$ are in the range of 2.2 to 2.8. These refractive indexes change depending on the sputtering conditions.

Since the thermal conductivity of SiN and AlSiN is relatively small, they are suitable for a magneto-optical disk having high recording sensitivity. Since AlTaN and TiN respectively include Ta and Ti, with the use of these materials, a magneto-optical disk having an excellent corrosion resistance is achieved. Since BN is extremely hard and has an excellent abrasion resistance, the magneto-optical disk is prevented from having scratches, thereby ensuring a reliable performance for a long time. The targets for ZnS, SiAlON and TiON are inexpensive. Since $TiO_2$, $BaTiO_3$ and $SrTiO_3$ have extremely large refractive indexes, a magneto-optical disk ensuring a high quality reproduced signal is achieved.

In this embodiment, AlN used as the protective film 6 has a thickness of 20 nm. However, the film thickness of the protective film 6 is not limited to this, and it is preferably set in the range of 1 to 200 nm.

In this embodiment, the total film thickness of the readout layer 3 or 3a, the recording layer 4 and the auxiliary recording layer 5 is set at 150 nm. With this thickness, the laser light 8 hardly passes through these magnetic layers. Therefore, there is no limit for the film thickness of the protective film 6 as long as the protective film 6 has a film thickness which prevents oxidization for a long time. When a material which has low oxidization resistance is used, the film thickness should be increased. On the other hand, when a material which has high oxidization resistance is used, the film thickness should be decreased.

The thermal conductivity of the protective film 6 as well as the transparent dielectric film 2 affects the recording sensitivity of the magneto-optical disk. More specifically, the recording sensitivity represents the laser power required for recording or erasing. Most portions of the light incident on the magneto-optical disk are transmitted through the transparent dielectric film 2, absorbed by the readout layer 3 or 3a, the recording layer 4 and the auxiliary recording layer 5 which are absorbing films, and changed into heat. Here, heat generated from the magnetic layers is transferred to the transparent dielectric film 2 and the protective film 6 due to the conduction of heat. Consequently, the respective thermal conductivities and the thermal capacities (specific heat) of the transparent dielectric film 2 and the protective film 6 affect the recording sensitivity.

This means that the recording sensitivity of the magneto-optical disk can be controlled to some extent by the film thickness of the protective film 6. For example, by making the film thickness of the protective film 6 thinner, the recording sensitivity is increased (a recording or erasing operation are carried out with low laser power). Normally, in order to extend the life of the laser, it is preferable to have relatively high recording sensitivity and the thinner protective film 6.

In this sense, AlN is a suitable material. Because of its excellent moisture resistance, by using it as the protective film 6, it is possible to reduce the film thickness and to provide a magneto-optical disk ensuring a high recording sensitivity.

In this embodiment, AlN is used for both the protective film 6 and, the transparent dielectric film 2. Therefore, the magneto-optical disk of this embodiment has an excellent moisture resistance. Moreover, since the same material is used for the transparent dielectric film 2 and the protective film 6, the productivity of the magneto-optical disk is improved. As described above, since AlN has an excellent moisture resistance, it is possible to form the AlN film with a relatively thin film thickness of 20 nm. The thinner film is also preferable in terms of productivity.

Considering the above objectives and effects, other than AlN, the materials: SiN, AlSiN, AlTaN, SiAlON, TiN, TiON, BN, ZnS, $TiO_2$, $BaTiO_3$ and $SrTiO_3$ which can also be used as materials for the transparent dielectric film 2 are suitable for the protective film 6.

Additionally, by forming the protective film 6 and the transparent dielectric film 2 from the same material, the productivity is improved.

In particular, since SiN, AlSiN, AlTaN, TiN, BN and ZnS does not contain oxygen, a magneto-optical disk having an excellent moisture resistance is achieved.

Not only glass, but also chemically tempered glass is a suitable material for the substrate 1. Alternatively, a so-called 2P-layered glass substrate which is formed by forming an ultraviolet rays-hardening resin film on the glass or chemically tempered glass substrate, polycarbonate (PC), polymethyl methacrylate (PMMA), amorphous polyolefin (APO), polystyrene (PS), polybiphenyl chloride (PVC), epoxy, etc., may be used for the substrate 1.

When chemically tempered glass is used as a material for the substrate 1, the following advantages are obtained: excellent mechanical properties (in the case of a magneto-optical disk, vibration, eccentricity, warp, tilt, etc. ) are achieved; the hardness of the substrate 1 becomes large; sand or dust is not likely to adhere to the substrate because it is harder to be charged compared with the plastic substrate; it is not likely to be dissolved into various kinds of solvent as it is chemically stable; the moisture resistance, oxidization resistance and thermal resistance are improved as it is chemically tempered, and a reliable performance of the magneto-optical recording medium is ensured for a long time; and a high quality signal is obtained due to its excellent optical property.

Additionally, when the glass or chemically tempered glass is used as a material for the substrate 1, the reactive dry etching is carried out on the surface of the glass substrate in order to form a guide track for guiding a light beam and produce a signal called a preformed pit on the substrate for recording an address signal, etc. The guide track or the preformed pit may also be formed on the resin layer by applying a so-called 2P-layered ultraviolet rays-hardening resin, closely attaching a stamper on which tracks and pre-formed pits are formed, projecting a light beam thereto, and by removing the stamper.

When PC is used as a material for the substrate 1, an injection molding is feasible. This allows the mass-production of the same substrate 1 and a reduction in the manufacturing cost. Since the substrate 1 made of PC has lower water absorption compared with other plastics, a reliable performance of the magneto-optical disk is ensured for a longer time, and excellent heat resistance and impact resistance are achieved. Additionally, materials including PC which permit injection molding, a guide track, a preformed pit, etc., can be formed simultaneously on the surface of the substrate 1 when molding if the stamper is installed on a metal molding mold in injection molding.

When PMMA is used as a material for the substrate 1, since the injection molding is feasible, a muss-production of the substrate 1 becomes available and the manufacturing cost is reduced. Such a substrate has a smaller double refraction compared with other plastics and an excellent optical property. Thus, a high quality signal is ensured. In addition, the substrate 1 thus formed is durable.

Using APO as a material for the substrate 1 produces the following advantages. Since the injection molding is feasible, a muss-production of the substrate 1 becomes available and the manufacturing cost is reduced. Since the substrate thus formed has a lower water absorption compared with other plastics, a reliable performance of the magneto-optical disk is ensured for a long time. Moreover, since the substrate 1 has a smaller double refraction compared with other plastics, it has an excellent optical property, and a high quality signal is ensured. Furthermore, the substrate 1 has high heat resistance and impact resistance.

Using PS as a material for the substrate 1 gives the following advantages. Since the injection molding is feasible, a muss-production of the substrate 1 becomes available and the manufacturing cost is reduced. Since the substrate thus formed has a lower absorbance compared with other plastics, a reliable performance of the magneto-optical disk is ensured for a long time.

Using PVC as a material for the substrate 1 produces the following advantages. Since the injection molding is feasible, a muss-production of the substrate 1 becomes available and the manufacturing cost is reduced. Since the substrate thus formed has a lower absorbance compared with other plastics, a reliable performance of the magneto-optical disk is ensured for a long time. Moreover, the substrate 1 is fire retardant.

Using epoxy as a material for the substrate 1 produces the following advantages. Since the injection molding is feasible, a muss-production of the substrate 1 becomes available and the manufacturing cost is reduced. Since the substrate thus formed has a lower absorbance compared with other plastics, a reliable performance of the magneto-optical disk is ensured for a long time. Moreover, the substrate 1 is formed by a thermosetting resin, it has an excellent heat resistance.

As described, various materials may be used for the substrate 1. However, when using the above materials for the substrate 1 of the magneto-optical disk, it is desired that a selected material has the following optical and mechanical properties:

refractive index: 1.44–1.62 double refraction: not more than 100 nm (double refraction measured by a parallel beam)

transmittance: not less than 90% variation in thickness: ±0.1 mm tilt: not more than 10 mrad vibration acceleration: not more than 10 m/s$^2$ radial direction acceleration: not more than 3 m/s$^2$.

The optical pickup for conversing a laser beam onto the recording layer 4 is designed by taking account of the refractive index of the substrate 1. Therefore, if the refractive index of the substrate 1 is changed to a large degree, the laser light 8 cannot be converged sufficiently. Furthermore, if the laser beam is not converged in a uniform manner, the temperature distribution of the recording medium (readout layer 3 or 3a and the recording layer 4) is subjected to change, affecting the recording and reproducing operations. In the present invention, the temperature distribution of the recording medium during reproduction is especially important. It is therefore desirable to set the refractive index of the substrate 1 within a range of 1.44 to 1.62.

Since the laser light 8 is incident on the recording medium through the substrate 1, if double refraction occurs in the substrate 1, the polarization state changes when the laser light 8 passes through the substrate 1. With the structure of the present invention, a change in the magnetic state of the readout layer 3 or 3a is recognized as a change in the polarization state by utilizing the Kerr effect during reproduction. Therefore, if the polarization state changes when the laser light 8 is transmitted through the substrate 1, a reproducing operation cannot be carried out. For this reason, double refraction of the substrate 1 is desired to be below 100 nm when measured by parallel light.

Also, if the transmittance of the substrate 1 becomes lower, for example, a reduced amount of a light beam is transmitted from the optical pickup through the substrate 1 during recording. Therefore, in order to retain a sufficient light amount for recording, a laser source which generates a higher output is required. Especially, with the structure of the present invention, since the recording medium has a double-layer structure composed of the recording layer 4 and the readout layer 3 or 3a, a greater amount of light is required for raising the temperature of the recording medium compared with the conventional recording medium of a single-layer structure (having no readout layers 3 and 3a). For this reason, the transmittance of the substrate 1 is preferably set to or above 90%.

The optical pickup for converging the laser light 8 on the recording medium is designed by taking account of the thickness of the substrate 1. Therefore, if the thickness of the substrate 1 varies to a great degree, the laser light 8 cannot be converged sufficiently. Furthermore, if the laser light 8 is not converged under the stable condition, the temperature distribution of the recording medium is changed, thereby adversely affecting the recording and reproducing operations. With the present invention, the temperature distribution of the recording medium during reproduction is especially important. It is therefore desirable to restrain the variation in the thickness of the substrate 1 within a range of ±0.1 mm.

If the substrate 1 is tilted, the laser light 8 from the optical pickup is converged on the tilted recording medium surface. Namely, the converged state changes depending on the degree of tilt. Thus, the variation in the thickness of the substrate 1 adversely affects recording and reproducing operations. In the present invention, the tilt of the substrate 1 is set below 10 mrad, more preferably below 5 mrad.

When the substrate 1 is moved up and down with respect to the optical pickup, the optical pickup is activated so as to compensate for the movement and to converge the laser light on the surface of the recording medium. However, if the substrate 1 is largely moved up and down, it becomes impossible to activate the optical pickup so as to completely compensate for the movement. Therefore, the laser light 8 cannot be converged on the recording medium sufficiently. This changes the temperature distribution of the recording medium, thereby adversely affecting recording and reproducing operations. In the present invention, since the temperature distribution of the recording medium during reproducing is especially important, the vibration acceleration in the up and down movement of the rotating substrate 1 is preferably set to or below 10 m/s$^2$.

On the substrate 1, the guide track for guiding a light beam is formed beforehand at 1.0 to 1.6 μm pitch. However, if the guide track is eccentric, the guide track moves in a radial direction with respect to the optical pickup when the disk is rotated. In this case, the optical pickup is activated to compensate for the movement in a radial direction and to converge the laser light 8 so as to maintain a predetermined relationship with the guide track. However, if the movement of the guide track in a radial direction becomes excessively large, it becomes impossible to activate the optical pickup so as to sufficiently compensate for the movement. Thus, the laser light 8 cannot be converged while keeping a predetermined relationship with the guide track. As described above, in the present invention, the temperature distribution of the recording medium during reproduction is especially important. As for the movement of the guide track in a radial direction when the substrate i is rotated, it is therefore desirable to set the acceleration in a radial direction to or below 3 m/s$^2$.

There are two methods for converging the laser light 8 onto a predetermined position on the magneto-optical disk:

successive servo system utilizing a spiral or concentric guide track; and a sample servo system utilizing a spiral or concentric pit string.

Figure 23:
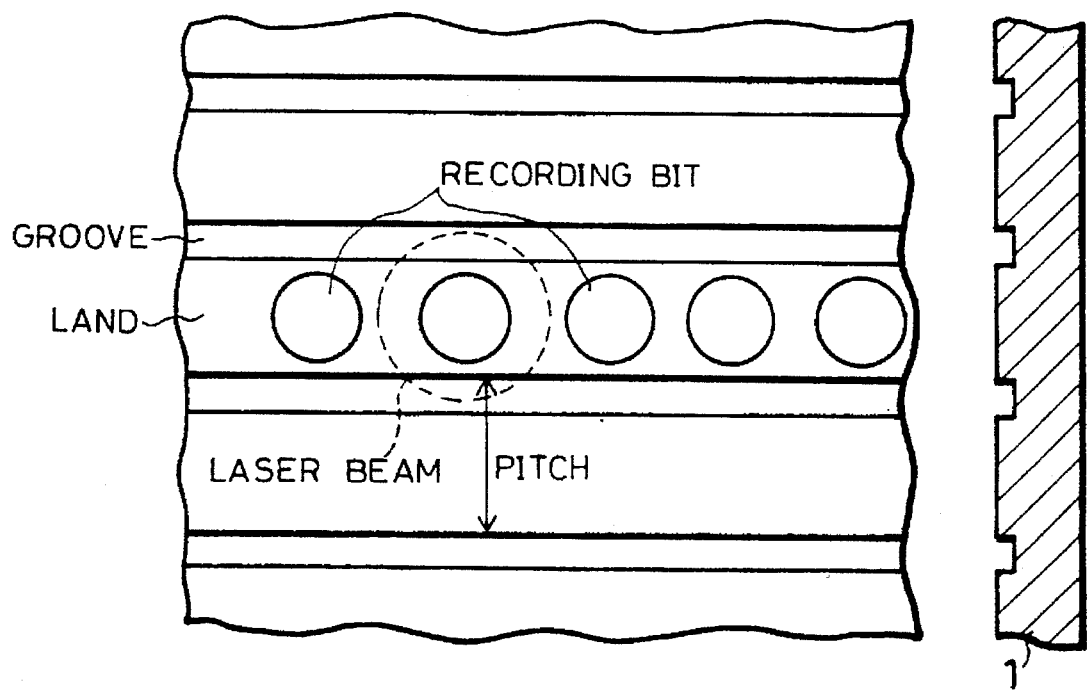

As shown in FIG. 23, with the successive servo system, grooves are formed to have a width of 0.2 to 0.6 µm, a depth of substantially λ/(8n) and at a pitch of 1.2 to 1.6 µm. Generally, recording and reproducing of information are carried out on and from lands of a so-called land-use magneto-optical disk. Here, λ indicates a wavelength of a laser beam, and n indicates the refractive index of the substrate 1 to be used.

It is possible to adapt the present invention to such a generally used method. With the present invention, crosstalk from recording bits on adjacent tracks is reduced to a great degree. Therefore, for example, with the land-use magneto-optical disk, even when grooves are formed with a width of 0.1 to 0.4 µm and at a pitch of 0.5 to 1.2 µm, recording and reproducing operations can be carried out without having an adverse effect of the crosstalk from the adjoining recording bits, resulting in a significant increase in the recording density.

Figure 24:
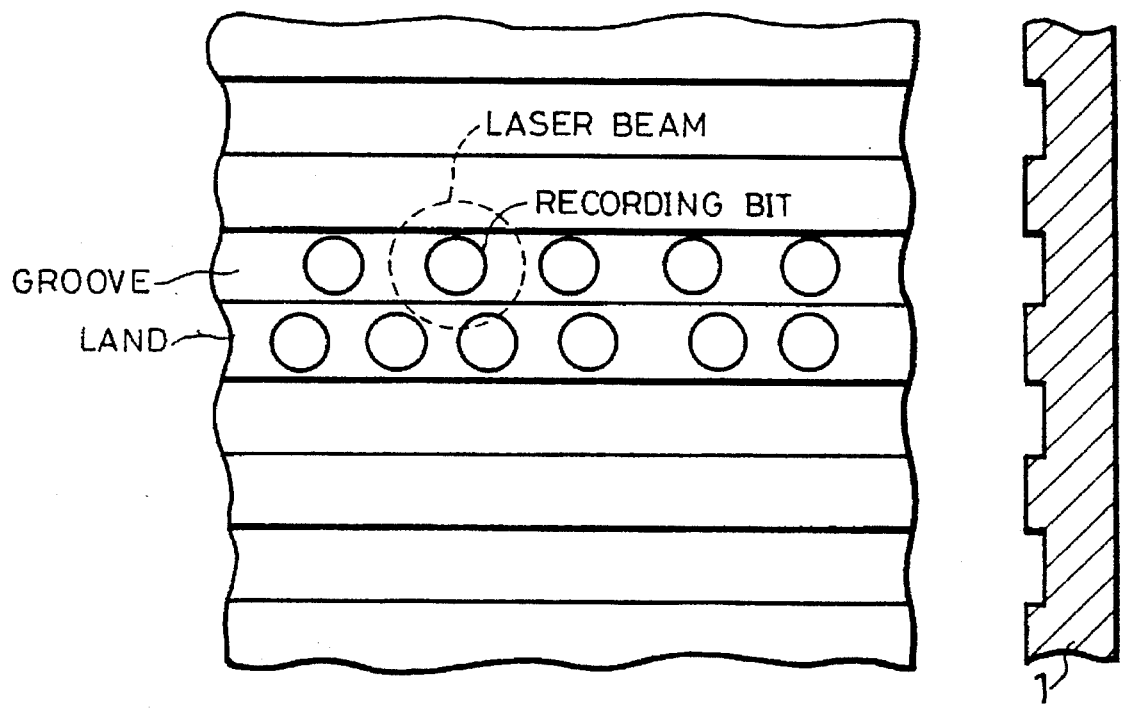

As shown in FIG. 24, when recording and reproducing operations are carried out on and from lands and grooves which are formed to have the same width and at a pitch of 0.8 to 1.6 µm, recording and reproducing operations can be carried out without having an adverse effect of the crosstalk from the adjoining recording bits. This structure results in an significant improvement of the recording density.

Figure 25:
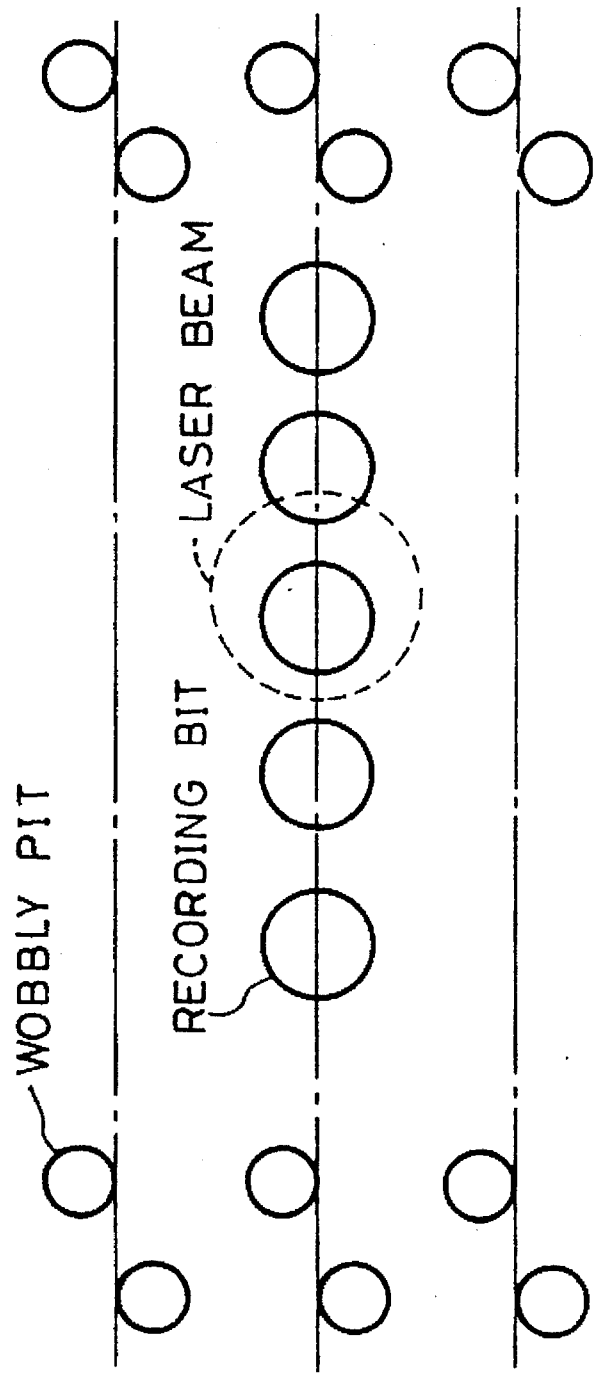

When the sample servo system is adapted, as shown in FIG. 25, a wobbly pit is formed beforehand with a depth of substantially (λ/(4n)) and at a pitch of 1.2 to 1.6 µm. In general, recording and reproducing of information are carried out so as to scan the center of the wobbly pit with the laser beam.

It is possible to adapt the present invention to such a generally used method. With the present invention, crosstalk from recording bits on the adjacent tracks can be reduced to a great degree. Therefore, information is recorded and reproduced on/from a magneto-optical disk having wobbly pits formed at a pitch of 0.5 to 1.2 µm without having an adverse effect of the crosstalk from the adjoining recording bits. This structure enables a significant improvement of the recording density.

Figure 26:
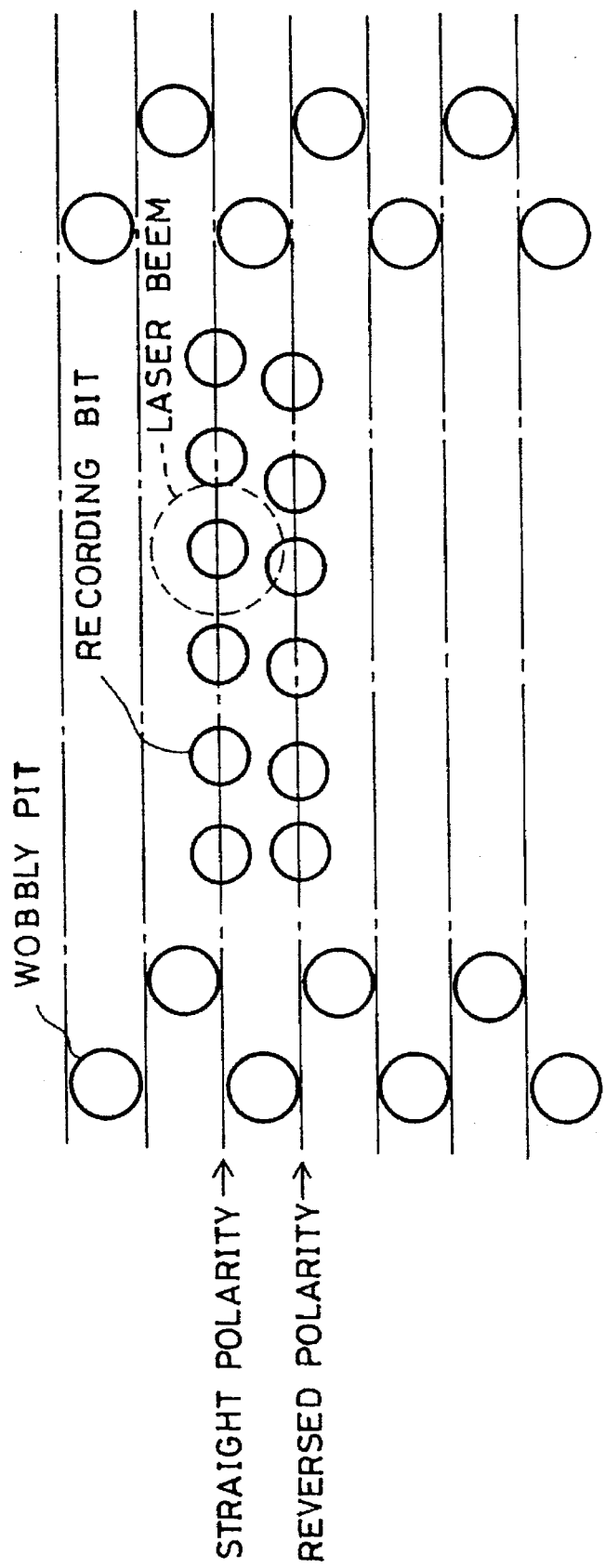

As shown in FIG. 26, wobbly pits are formed at a pitch of 0.8 to 1.6 µm, and recording and reproducing of information are carried out in an area having a wobbly pit of opposite polarity. With this structure, recording and reproducing operations can be carried out without having an adverse effect of the crosstalk from the adjoining recording bits, thereby significantly improving the recording density.

Figure 27:
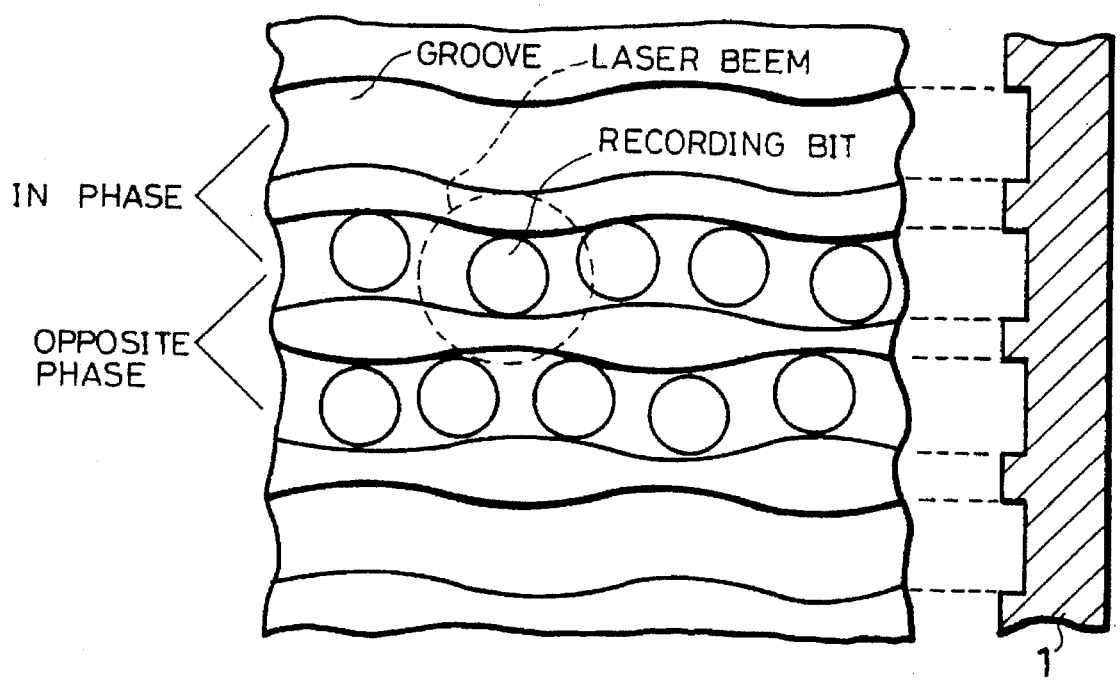
Figure 28:
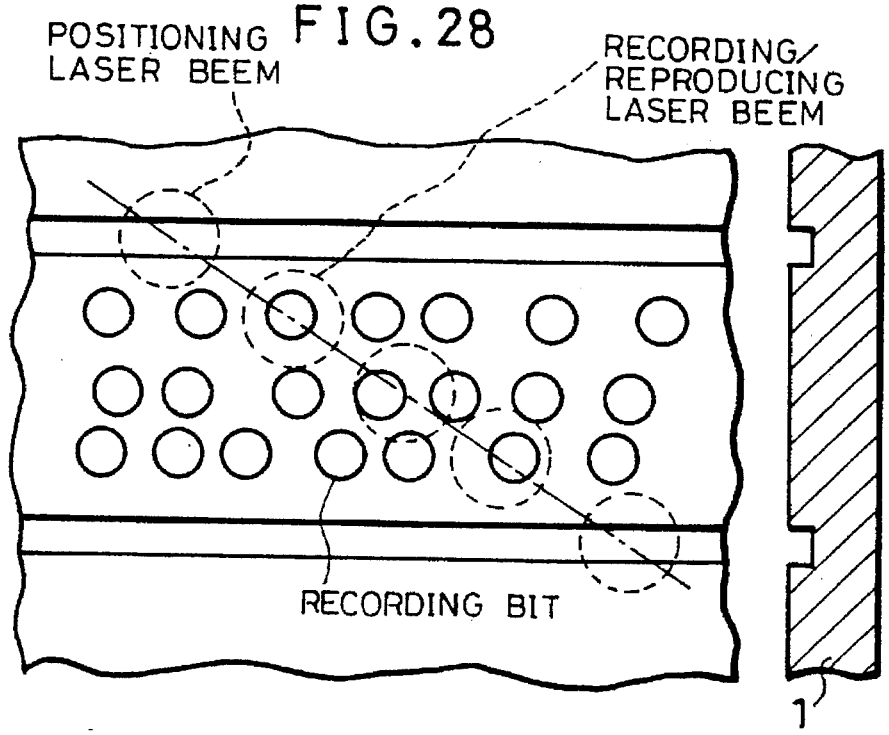

As shown in FIG. 27, with the successive servo system, when information indicative of position on the magneto-optical disk is obtained by wobbling the grooves, the crosstalk from the recording bits on the adjoining grooves becomes large in the area having a phase opposed to the wobbling state. However, with the present invention, crosstalk from the recording bits on the adjoining grooves is prevented even in the area having the opposed wobbling state, thereby achieving preferable recording and reproducing operations.

Moreover, the magneto-optical disk of this embodiment is used with a variety of the following recording and reproducing optical pickups.

For example, when an optical pickup of a multiple beam system using a plurality of light beams is used, it is generally positioned such that among a plurality of light beams, the light beams on both ends scan the guide track, and recording and reproducing operations are carried out using the light beams between them. However, with the use of the magneto-optical disk of the present invention, even when the width of the light beam is reduced, a reproducing operation can be carried out without having an adverse effect of the crosstalk from the adjoining recording bits, and thus the pitch of the guide track is shortened. Alternatively, a greater number of laser beams can be used between a pair of guide tracks for recording and reproduction so as to achieve an even higher density recording and reproduction.

In the above explanation, the guide track pitch, etc., has been discussed by assuming that the number of aperture (N.A.) of the objective lens of the optical pickup is in a range of 0.4 to 0.6 which is a generally used value, and the wavelength of the laser light is in a range of 670 to 840 nm. However, by increasing the N.A. to a range of 0.6 to 0.95, a laser beam is converged into a smaller spot, and by adapting the magneto-optical disk of the present invention, the pitch and the width of the guide track is made still narrower, thereby permitting a still higher recording and reproducing density.

Additionally, using an argon laser beam with a wavelength of 480 nm or a laser beam with a wavelength of 335 to 600 nm utilizing a SHG element enables the laser beam to be converged into a smaller spot. Further, using the present invention enables the pitch and the width of the guide track to be made still smaller. Consequently, still higher density recording and reproducing operations are achieved.

a/w in a range of 0.3 to 1.0 may be used. Here, a represents optically effective diameter of the lens, and w represents a radius at which the intensity of the light beam is $1/e^2$ of the central intensity of the light beam when the intensity of the light beam shows Gaussian distribution.

The following description discusses the disk format to be adapted in the magneto-optical disk of this embodiment.

In general, in order to maintain the compatibility between magneto-optical disks of different brands and of different types, a value and a duty of the power required in recording and erasing at each radial position are recorded beforehand in the form of a pre-formed pit string with a depth of substantially (λ/(4n)) in a part of inner or outer circumference. Moreover, based on the read values, a test area is provided in inner or outer circumference to allow recording and reproducing tests (for example, see IS10089 standard).

As for the reproducing power, information which indicates a reproducing power is recorded beforehand in a portion of an inner or outer circumference in a form of a preformed pit string.

With the present invention, the temperature distribution of the recording medium during reproduction largely affects the reproducing performance. It is therefore extremely important to determine the reproducing power.

As a method for setting a reproducing power, for example, the following method is preferable. Like the recording power, a test area for setting a reproducing power is provided on an inner or outer circumference, and information for optimizing the reproducing power which is obtained from the test area for each radial position is preferably recorded in advance on a part of an inner or outer circumference in a form of a pit string.

Especially, when a magneto-optical disk player which adapts a CAV system for producing a constant rotating speed, since the linear velocity of the magneto-optical disk changes depending on the radial position, the reproducing laser power is preferably adjusted for each radial position. Therefore, information segmented into as many areas as possible in a radial direction is preferably recorded in a form of a preformed pit string.

As a method for determining an optimum reproducing laser power at each radial position, the following method is also available. A recording area is divided into a plurality of zones according to a radial position, and the optimum recording power and the reproducing power are determined using the test areas provided in the respective boundaries of the zones, thereby permitting accurate control of the temperature distribution of the recording medium during reproduction. This method allows preferable recording and reproducing operations.

The magneto-optical disk of this embodiment is applicable to a various recording system as explained below.

A method for recording information on the first generation of magneto-optical disks incapable of overwriting is described first.

A first-generation magneto-optical disk under IS10089 standard (ISO standard set for 5.25" rewritable optical disk) has been sold a lot. Since overwriting is unavailable with this type of magneto-optical disk, in order to write new information on a portion which has already contained information, the previously recorded information must be erased from the portion before recording the new information. Namely, at least two rotations of the magneto-optical disk are required to write the new information. Thus, the first generation of magneto-optical disks suffer from low data transfer speeds.

However, the first generation of magneto-optical disks have such an advantage that a requirement for the magnetic films is not as high as for magneto-optical disks capable of overwriting (to be described later).

In order to permit overwriting, for example, the following method has been used by some devices. With this method, a plurality of optical heads are provided to eliminate the time loss caused by waiting and to improve a data transfer speed.

More specifically, when two optical heads are used, a first optical head is used for erasing recorded information; and a second optical head which follows the first optical head is used for recording new information. For reproduction, either the first or second optical head is used.

In the case where three optical heads are used, the first optical head is used for erasing the recorded information, the second optical head is used for recording new information, and a third optical head is used for verifying if new information is accurately recorded.

It is also possible to perform overwriting using a single optical head instead of a plurality of optical heads by producing a plurality of light beams with a beam splitter.

These structures allow recording of new information without erasing the previously recorded information. Thus, virtual overwriting is available with a first-generation magneto-optical disk.

Since the magneto-optical disk of this embodiment permits recording information on the recording layer 4 by controlling the magnetization direction of the readout layer 3 or 3a and of the auxiliary recording layer 5 with a recording magnetic field. It is thus possible to use the recording method with the magneto-optical disk of this embodiment.

Next, the magnetic-field modulation overwriting system is explained.

By the magnetic-field modulation overwriting system, information is recorded on the recording layer 4 by controlling the magnetization direction of the readout layer 3 or 3a and the auxiliary recording layer 5 with a recording magnetic field. It is thus possible to adapt the recording method.

With the magnetic-field modulation overwriting system, recording is performed by modulating the intensity of the magnetic filed in accordance with the information while projecting a laser light of a uniform power onto the magneto-optical recording medium. The magnetic-field modulation overwriting system is explained below in more detail with reference to FIG. 29.

Figure 31:
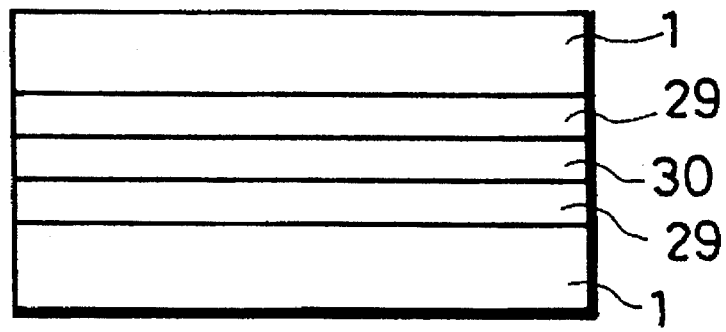

FIG. 31 is a typical depiction which shows one example of the magneto-optical disk player which overwrites information on a magneto-optical disk 24 by the magnetic-field modulation. The device is provided with a light source (not shown) for projecting the laser light 8 for recording and reproduction, an optical head 21 including a receiving element (not shown) for receiving a reflected light from the magneto-optical disk 24 during recording and reproduction, and a floating-type magnetic head 22 which is electrically or mechanically connected to the optical head 21.

The floating-type magnetic head 22 is composed of a floating slider 22a and a magnetic head 22b which includes a core made of MnZn ferrite, etc., having a coil wound around thereon. The floating-type magnetic head 22 is pressed down toward the magneto-optical disk 24 so as to maintain a predetermined distance of approximately several μm to several tens μm.

In this state, the floating-type magnetic head 22 and the optical head 21 are moved to a desired radial position in the recording area of the magneto-optical disk 24, and the laser light 8 with a power of 2 to 10 mW from the optical head 21 is converged thereon to raise the temperature of the recording layer 4 to the vicinity of Curie temperature (or the temperature at which coercive force becomes nearly zero). In this state, a magnetic field whose magnetization direction is reversed upward and downward in accordance with information to be recorded is applied from the magnetic head 22b. Thus, information is recorded by the overwriting system without including an erasing process of previously recorded information.

In this embodiment, the laser power used in overwriting by the magnetic-field modulation is set uniform. However, when the polarity of the magnetic field changes, if the laser power is reduced to a power at which recording is infeasible, the shape of the recording bit is improved, thereby resulting in a reproduced signal of improved quality.

Figure 30:
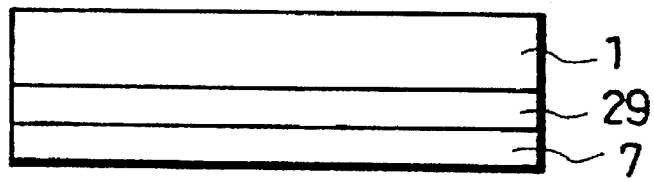

The magneto-optical disk 24 is of a so-called single sided type. The thin films of the magneto-optical disk 24, i.e., the transparent dielectric film 2, the readout layer 3 or 3a, the recording layer 4 and the protective film 6 are referred to.as a recording medium layer. Namely, the magneto optical disk 24 is composed of the substrate 1, a recording medium layer 29 and the overcoat film 7 as shown in FIG. 30.

Figure 29:
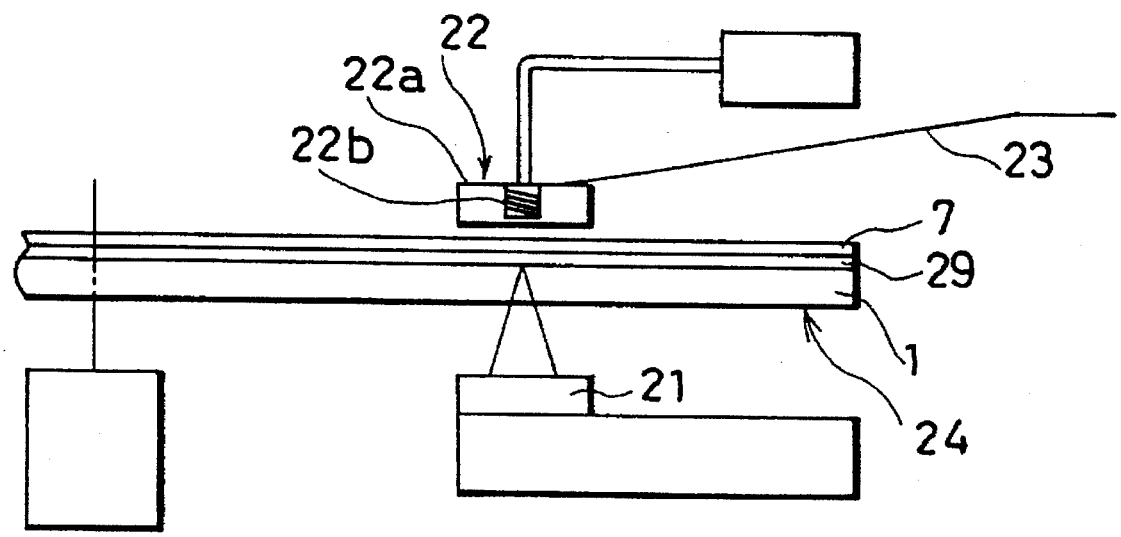

A so-called both sided magneto-optical disk is shown in FIG. 29. In the magneto-optical disk of this type, a pair of the substrates 1 whereon the recording medium layers 29 are respectively laminated by an adhesive layer 30 so that respective recording magnetic layers 29 face each other.

As for the material for the adhesive layer 30, a polyurethane acrylate series adhesive agent is particularly preferable. The above adhesive agent has a combination of the hardening properties under an application of ultraviolet rays, heat and anaerobic. Thus, a shadow portion of the recording medium layer 29 which does not allow the ultraviolet rays to pass through is hardened by heat and anaerobic. It is therefore possible to provide a double-sided magneto-optical disk which has extremely high moisture resistance, ensuring a reliable performance for a long time.

On the other hand, since the single-sided magneto-optical disk has a thickness which is a half of the thickness of the double-sided magneto-optical disk, it is suitable for use in a compact magneto-optical recording and reproducing device, for example.

The double-sided magneto-optical disk is suitable for use in a large capacity recording and reproducing device because information is reproducible from both sides thereof.

When determining which type of the magneto-optical disk is suitable, the thickness and the capacity of the magneto-optical disk should be considered as explained above. In addition, as explained below, a recording method is needed to be carefully selected when determining a type of the magneto-optical disk to be used.

As well known, information is recorded on the magneto-optical disk using a light beam and a magnetic field. As shown in FIG. 29, in the magneto-optical disk player, a light beam emitted from a light source such as a semiconductor laser is converged on the recording medium layer 29 through the substrate 1 by the converging lens. Additionally, a magnetic field is applied to the recording medium layer 29 by a magnetic field generation device such as a magnet and an electro-magnet (for example, floating-type magnetic head 22), disposed to face the light source. When recording, by setting the light beam intensity higher than the light beam used for reproducing, the temperature of the portion of the recording medium layer 29 exposed to the converged light beam is raised. As a result, a coercive force of the magnetic film at the portion becomes smaller. In this state, by externally applying a magnetic field larger than the coercive force, the magnetization direction of the magnetic film is aligned with the magnetization direction of the applied magnetic field, thereby completing the recording process.

For example, by the magnetic-field modulation overwriting method wherein the recording-use magnetic field is modulated according to the information to be recorded, the magnetic field generating device (mostly an electro-magnet) is needed to be disposed closer to the recording medium layer 29. The reason for this is that, due to the limitations of heat generation by the coil of the electro-magnet, electric power consumption of the device and the size of magnetic field generating device, etc., when generating a magnetic field required for recording (generally 50 Oe to several hundreds Oe) by modulating at a frequency required for recording (usually, several hundreds kHz to several tens MHz), the magnetic field generating device is needed to be disposed so that the distance between the magnetic filed generating device and the magneto-optical disk is about 0.2 mm or less, more preferably about 50 µm. In the case of the both-sided magneto-optical disk, the thickness of the substrate 1 is at least 0.5 mm and normally 1.2 mm. Thus, when the electro-magnet is placed to face the light beam, the magnetic field sufficient for recording cannot be ensured. For this reason, when the recording medium layer 29 suitable for overwriting by the magnetic-field modulation is adapted, a single-sided magneto-optical disk is often used.

Meanwhile, in the case of the overwriting method by the light-intensity modulation wherein a light beam is modulated according to information to be recorded, recording can be carried out with a uniform magnetic field $H_B$ whose magnetization is fixed in one direction. Therefore, for example, a permanent magnet which has a magnetic filed of high intensity is used. Thus, unlike the magnetic-field modulation, there is no need to dispose the magnetic field generating device in a position closest to the recording medium layer 29. It is therefore possible to dispose the magnetic filed generating device in a position several mm away from the recording medium layer 29. Consequently, not only the single-sided type but also doubly-sided type magneto-optical disk can be used.

If the magneto-optical disk of this embodiment is of a single-sided type, it may have various structures as follows.

A first example of a magneto-optical disk has a hard coat layer, not shown, on the overcoat film 7. More specifically, the magneto-optical disk is composed of the substrate 1, the recording medium layer 29, the overcoat film 7 and a hard coat layer. As for the hard coat layer, for example, a film of an acrylate series ultraviolet rays-hardening type hard coat resin film (hard coat layer) is formed on the overcoat film 7 which, for example, is made of a polyurethane acrylate series ultraviolet rays-hardening resin with a thickness of substantially 6 µm. The hard coat layer may be formed with a film thickness of 3 µm.

With this structure, since the overcoat film 7 is formed, the deterioration of the property of the recording medium layer 29 due to the oxidization is prevented, thereby ensuring reliable recording and reproducing operations for a long time. Additionally, since the hard coat layer which is made of a hard material and has large wear resistance is provided, even if the magnet for use in recording comes into contact with the disk, the disk hardly has scratches, or even if it has scratches, the scratches would not reach the recording medium layer 29.

Needless to say, it is possible to omit the hard coat layer if the overcoat film 7 is designed to have the function of the hard coat layer.

A second example of the single-sided magneto-optical disk of this embodiment has a hard-coat layer formed on the overcoat film 7, and a hard-coat layer, not shown, formed on a side of the substrate 1 where the recording medium layer 29 is not formed. Namely, the magneto-optical disk is composed of a hard coat layer, the substrate 1, the recording medium layer 29, the overcoat film 7, and another hard coat layer.

As for the material for the substrate 1 of the magneto-optical disk, a plastic such as PC is generally used. However, since the plastic is very soft compared with a glass material, it easily has scratches even by rubbing with a nail. If the disk has deep scratches, a servo jump may occur. This may cause the recording and reproducing operations to be infeasible.

When reproducing information from the magneto-optical disk of this embodiment, only the center portion of the light beam is used. Thus, in comparison with a conventional magneto-optical disk, the defectiveness of the surface of the substrate 1 such as scratches more adversely affects reproduction. In order to overcome such a problem, the hard coat layer is provided on the side of the substrate 1 where the recording medium layer 29 is not formed. This structure is very effective for preventing scratches on the disk.

The same effect can be produced by the double-sided magneto-optical disk by providing a hard coat layer on both the surfaces of the substrate 1.

A third example of the magneto-optical disk has a charge preventing coat layer (not shown) formed on the overcoat film 7 or the hard coat layer of the first or the second example. The magneto-optical disk may include a layer having a charge preventing function instead of the charge preventing coat layer.

Like the problem caused by scratches, if the dust adheres to the surface of the substrate 1, recording and reproduction of information may become infeasible. When the overwriting method by the magnetic-field modulation is adopted and when a magnet as the floating-type magnetic head 22 (FIG. 29) is placed several µm above the overcoat film 7, if dust adheres onto the overcoat film 7, the floating-type magnetic head 22 and the recording medium layer 29 get damaged due to the dust.

However, with the structure of this embodiment, since a layer having a charge preventing function is formed on a surface of the magnet-optical disk on the substrate 1 side or the recording medium layer 29 side, it is possible to prevent dust from adhering to the substrate 1 and the overcoat film 7.

When reproducing information from the magneto-optical disk of this embodiment, only a center portion of the light beam is used. Therefore, the defectiveness of the surface of the substrate 1 such as dust more badly affects the reproduction compared with the conventional case. Thus, the above-mentioned structure for preventing dust adhering to the surface of the substrate 1 is very effective.

As for the charge preventing layer, for example acrylic series hard coat resin into which an electrically conductive filler is mixed is used. The charge preventing layer is preferably formed to have a thickness of about 2 to 3 µm.

The charge preventing film is provided to decrease the surface resistance and to prevent dust from adhering to the surface of the substrate 1 irrespectively of the material of the substrate 1, i.e., plastic or glass.

Needless to say, it is also possible to produce the overcoat film 7 or the hard coat layer having a charge preventing effect.

This structure is also applicable to both the surfaces of the substrate 1 of a double-sided magneto-optical disk.

A fourth example of the magneto-optical disk has a lubricant film (not shown) formed on the overcoat film 7. Namely, the magneto-optical disk is composed of the substrate 1, the recording medium layer 29, the overcoat film 7 and the lubricant film. A fluorocarbon series resin is a material suitable for the lubricant film. The preferable film thickness of the lubricant film is substantially 2 µm.

When performing the magnetic-field modulation overwriting using the floating-type magnetic head 22, since the lubricant film is provided, the lubrication between the floating-type magnetic head 22 and the magneto-optical disk is improved.

The floating-type magnetic head 22 is positioned several µm to several tens µm above the recording medium layer 29. Namely, the space between the floating-type magnetic head 22 and the recording medium layer 29 is maintained by balancing the pressing force produced by a suspension 23 and the floating force generated by the air flow due to the rotation of the disk. The pressing force presses the floating magnetic head 22 toward the recording medium layer 29, while the floating force causes the floating magnetic head 22 to apart from the recording medium layer 29. The floating force is generated by a flow of air which is caused when the magneto-optical disk is rotated at high speeds.

If the floating-type magnetic head 22 is used together with the CSS (contact-Start-Stop) method in which the floating-type magnetic head 22 and the magneto optical disk are in contact with one another from the start of rotating the disk until the magneto-optical disk is rotated at a predetermined speed, and until the disk is completely stopped after the switch is turned off, a problem may arise. Namely, if the floating-type magnetic head 22 adheres to the magneto-optical disk, the floating-type magnetic head 22 may get damaged when the magneto-optical disk is started rotating. However, with the structure of the magneto-optical disk of this embodiment, since a lubricant film is formed on the overcoat film 7, the lubrication between the floating-type magnetic head 22 and the magneto-optical disk is improved, and thereby preventing the floating-type magnetic head 22 from getting damaged.

Needless to say, if a moisture resistant protective material which prevents the deterioration of the recording medium layer 29 is used, it is not necessary to provide the overcoat film 7 and the lubricant film separately.

A fifth example of the magneto-optical disk of this embodiment has a moisture-proof layer (not shown) and a second overcoat film (not shown) formed on a side of the substrate 1 where the recording medium layer 29 is not formed. Namely, the magneto-optical disk is composed of the second overcoat film, the moisture-proof layer, the substrate 1, the recording medium layer 29 and the overcoat film 7.

As for the material for the moisture-proof layer, a transparent dielectric material such as AlN, AlSiN, SiN, AlTaN, SiO, ZnS, $TiO_2$, may be used, and the suitable thickness for the moisture-proof layer is approximately 5 nm. The second overcoat film is effective especially when a high moisture permeability plastic material such as PC is used for the substrate 1.

The moisture-proof layer is effective to minimize the warping of the magneto-optical disk due to a change in environmental moisture. The following description discusses the effect in detail.

If the moisture-proof layer is not provided, for example, when the environmental moisture changes largely, moisture is absorbed or released in or from only the side of the substrate 1 where the recording medium layer 29 is not provided, i.e., the light incident side of the plastic substrate 1. The moisture absorption and release causes a partial change in the volume of the plastic substrate 1, resulting in the warped plastic substrate 1.

When the substrate 1 warps, it tilts with respect to the axis of the light beam used in reproducing or recording information. As a result, a servo does not operate properly, and the signal quality is lowered. In the worst case, a servo may skips.

Additionally, if the substrate 1 tilts, the laser light 8 from the optical head 21 (see FIG. 29) is converged on the surface of the tilted recording medium layer 29. The converged state thus changes depending on the degree of tilt. This adversely affects the recording and reproducing operations.

Furthermore, when the substrate 1 is moved up and down with respect to the optical head 21, the optical head 21 is activated to compensate for the movement of the substrate 1 and to converge the laser light 8 on the surface of the recording medium layer 29. However, when the upward and downward movement of the substrate 1 is excessively large, the optical head 21 cannot fully compensate for the movement. As a result, the laser light 8 cannot be converged on the recording medium layer 29 properly. This causes a change in the temperature distribution of the recording medium layer 29, affecting the recording and reproducing operations. With the structure of this embodiment, since the temperature distribution of the recording medium layer 29 during reproduction is particularly important, it is necessary to minimize the warp of the substrate 1 and the change in the warping degree caused by environmental changes.

With this structure of the magneto-optical disk, since the moisture-proof layer prevents the front surface of the substrate 1 from absorbing and releasing moisture, the warp of the substrate 1 is significantly minimized. This structure is therefore particularly suitable for the present invention.

The second overcoat film on the moisture-proof layer prevents the moisture-proof layer from having scratches and protects the surface of the substrate 1. The second overcoat film may be formed by the same material used for the overcoat film 7 on the recording medium layer 29.

The hard coat layer or the charge preventing layer may be provided instead of the second overcoat film or on the second overcoat film.

Figure 32:
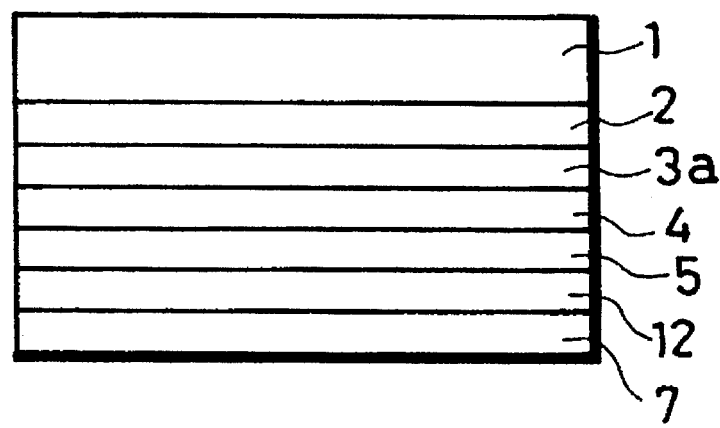
FIG. 32 is a view showing a schematic structure of a magneto-optical recording medium according to the fifth embodiment of the present invention.

The following description discusses a fifth embodiment of the present invention with reference to FIG. 32. The members having the same function as in the above-mentioned embodiments will be designated by the same code and their description will be omitted.

As illustrated in FIG. 32, a magneto-optical recording disk of this embodiment is composed of the substrate 1 having thereon the transparent dielectric film 2, the readout layer 3a, the recording layer 4, the auxiliary recording layer 5, a radiating layer 12 and the overcoat film 7 formed in this order.

As for the material for the radiating layer 12, Al may be used, and the film thickness is preferably set in the vicinity of 100 nm. As for the materials for the substrate 1, the transparent dielectric film 2, the readout layer 3a, the recording layer 4, the auxiliary recording layer 5 and the overcoat film 7, the materials used in the previous embodiments may be used.

The magneto-optical disk of this embodiment is constructed by forming the radiating layer 12 on the auxiliary recording layer 5 of the magneto-optical disk of the second embodiment. This magneto-optical disk thus has the following function and effect in addition to the function and effect of the disk of the second embodiment.

In this embodiment, since the radiating layer 12 is formed on the auxiliary recording layer 5, the shape of the recording bit is sharpened. The reasons for this are as follows.

Most of the light beam applied to the magneto-optical disk from the light incident side is absorbed by the readout layer 3a, the recording layer 4 and the auxiliary recording layer 5, and converted into heat. At this time, the heat is conducted in a vertical direction of the readout layer 3a, the recording layer 4 and the auxiliary recording layer 5, and is also conducted in a horizontal direction of the layers. When a large amount of heat is conducted in the horizontal direction at a low speed, if high density recording is to be performed at higher speeds, the recording bit to be recorded next is thermally affected adversely. If this occurs, the length of the recording bit becomes longer than a predetermined length or the size of the recording bit is expanded in a direction orthogonal to the track direction. If the recording bit is expanded in the direction orthogonal to the track direction, the amount of crosstalk may increase, thereby preventing proper recording and reproducing operations.

In this embodiment, the radiating layer 12 made of Al having the high thermal conductivity is formed on the auxiliary recording layer 5. The heat conducted is released toward the radiating layer 12, i.e., in a vertical direction, thereby reducing the spread of heat in the direction perpendicular to the track direction. Consequently, recording is carried out without having a thermal interference under the high density and high speed recording conditions.

Inclusion of the radiating layer 12 provides the following advantages in overwriting by light-intensity modulation.

Since the radiating layer 12 is provided, in the process of recording, when the area whose temperature has been raised by the projection of the light beam is cooled down, the differences in the change of the temperatures among the readout layer 3a, the recording layer 4 and the auxiliary recording layer 5 are made more significant. Hence, the overwriting by the light-intensity modulation is more easily performed.

Al used for the radiating layer 12 has a higher thermal conductivity compared with the film of the rare-earth transition metal alloy used for the readout layer 3a, the recording layer 4 and the auxiliary recording layer 5. Thus, Al is a suitable material for the radiating layer 12. Additionally, since AlN is formed by reactively sputtering an Al target by Ar and $N_2$ gas, the radiating layer 12 can be easily formed by sputtering the same Al target by Ar gas. Al is a considerably inexpensive material.

A sample (#5-1) of a magneto-optical disk as the magneto-optical recording medium of this embodiment is explained below.

The substrate 1 is made of a disk-shaped glass with a diameter of 86 mm, an inner diameter of 15 mm and a thickness of 1.2 mm. Although it is not shown, lands and grooves are formed on a surface of the substrate 1 to produce a guide track for guiding a light beam. The track is formed at a pitch of 1.6 µm, with a groove width of 0.8 µm and a land width of 0.8 µm.

AlN with a thickness of 80 nm is formed as the transparent dielectric layer 2 on the surface of the substrate 1 whereon the guide track is formed.

The readout layer 3a, the recording layer 4 and the auxiliary layer 5 are formed on the transparent dielectric layer 2.

For the readout layer 3a, a thin film of rare-earth transition metal alloy made of GdFeCo with a thickness of 50 nm is formed on the transparent dielectric layer 2. The composition of GdFeCo is $Gd_{0.29}(Fe_{0.82}Co_{0.18})_{0.71}$, and the Curie temperature thereof is around 280° C.

For the recording layer 4, a thin film of rare-earth transition metal alloy made of DyFeCo with a thickness of 50 nm is formed on the readout layer 3a. The composition of DyFeCo is $Dy_{0.23}(Fe_{0.78}Co_{0.22})_{0.77}$, and the Curie temperature thereof is around 200° C.

The combination of the readout layer 3a and the recording layer 4 causes the readout layer 3a to have substantially in-plane magnetization at room temperature and to have perpendicular magnetization within the temperature range between 100° and 125° C.

For the auxiliary recording layer 5, a thin film of rare-earth transition metal alloy made of GdFeCo with a thickness of 50 nm is formed on the recording layer 4. The composition of GdFeCo is $Gd_{0.17}(Fe_{0.82}Co_{0.18})_{0.83}$, and the Curie temperature thereof is around 320° C.

AlN with a thickness of 100 nm is placed as the radiating layer 12 on the auxiliary recording layer 5.

A polyurethane acrylate series ultraviolet rays-hardening resin with a thickness of 5 µm is placed as the overcoat film 7 on the radiating layer 12.

The suitable material for the radiating layer 12 is not limited to Al. Other material may be used as long as it has a larger thermal conductivity than the readout layer 3a, the recording layer 4 and the auxiliary recording layer 5. For example, Au, Ag, Cu, SUS, Ta or Cr are used.

When using Au, Ag or Cu for the radiating layer 12, a reliable performance of the film is ensured for a long time because they have high resistance against oxidization, humidity and corrosion.

When using SUS, Ta or Cr for the radiating layer 12, a reliable performance of the film is ensured for a long time because they have extremely high resistance against oxidization, humidity and corrosion.

In this embodiment, the thickness of the radiating layer 12 is set at 100 nm. The thicker the radiating layer 12, the larger the radiating effect. Consequently, long-time reliability is improved by increasing the film thickness. However, in considering the recording sensitivity of the magneto-optical disk as described earlier, it is necessary to determine the film thickness in accordance with the thermal conductivity and the specific heat. Namely, the film thickness is preferably set within a range of 5 to 200 nm, and more preferably within a range of 10 to 100 nm. By using the material having a relatively high heat conductivity and high resistance against corrosion, it is possible to make the film thickness in a range of 10 to 100 nm, thereby reducing the time required for forming the film.

It may possible to insert a dielectric layer, not shown, between the auxiliary recording layer 5 and the radiating layer 12. The preferable film thickness of the dielectric layer is between 10 and 100 nm. As for the material, the same material used for the transparent dielectric layer 2 may be used. For example, the materials used in the above-mentioned embodiments, such as AlN, SiN, and AlSiN, etc. are used. In particular, by using a nitride film such as AlN, SiN, AlSiN, TiN, AlTaN, ZnS, and BN which do not contain oxygen, a magneto-optical disk ensuring a reliable performance for a longer time is provided.

As described above, the magneto-optical recording medium of the present invention does not require an initializing magnetic field.

In the above-mentioned embodiments, the magneto-optical disk is discussed as the magneto-optical recording medium. However, the present invention is also applied to a magneto-optical card, magneto-optical tape, etc. Additionally, in the case of the magneto-optical tape, instead of the rigid substrate 1, a flexible tape base, for example, a base made of polyethylene terephtalate may be used.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording medium comprising:

a base;

a readout layer formed on said base;

a recording layer formed on said readout layer;

an auxiliary recording layer formed on said recording layer, each of said readout layer, recording layer and auxiliary recording layer comprising an alloy of rare-earth metal exhibiting ferrimagnetism and transition metal, said alloy composition of each of said readout layer, said recording layer and said auxiliary recording layer being such that said recording layer has a Curie temperature lower than Curie temperatures of said readout layer and said auxiliary recording layer, and said recording layer has a coercive force higher than coercive forces of said readout layer and said auxiliary recording layer at room temperature and that, when a temperature of said recording layer is raised to a temperature approximately equal to its Curie temperature while perpendicularly applying a uniform recording magnetic field to each layer, a sublattice magnetic moment of the rare-earth metal of said readout layer and a sublattice magnetic moment of the rare-earth metal of said auxiliary recording layer are antiparallel to each other.

2. The magneto-optical recording medium according to claim 1, wherein said readout layer has in-plane magnetization at room temperature such that in-plane magnetic anisotropy is stronger than perpendicular magnetic anisotropy and wherein the alloy composition of said readout layer is such that, when a temperature of said readout layer is raised to its compensation temperature, said readout layer has perpendicular magnetization in which the perpendicular magnetic anisotropy is stronger than the in-plane magnetic anisotropy.

3. The magneto-optical recording medium according to claim 1 or 2, wherein an intermediate layer comprising a film having in-plane magnetization is formed at least between said readout layer and said recording layer or between said recording layer and said auxiliary recording layer.

4. The magneto-optical recording medium according to claim 1 or 2, wherein a radiating layer is formed on a surface of said auxiliary recording layer where said recording layer is not formed.

5. The magneto-optical recording medium of claim 1 wherein said readout layer comprises a thin film of rare-earth transition metal alloy made of rare-earth rich GdFeCo.

6. The magneto-optical recording medium of claim 5 wherein said thin film of said readout layer is approximately 50 nm thick.

7. The magneto-optical recording medium of claim 1 wherein said readout layer comprises a thin film of rare-earth transition metal alloy of a composition $Gd_{0.26}(Fe_{0.82}Co_{0.18})_{0.74}$.

8. The magneto-optical recording medium of claim 1 wherein said recording layer comprises a thin film of rare-earth transition metal alloy made of transition metal rich DyFeCo.

9. The magneto-optical recording medium of claim 8 wherein said thin film of said recording layer is approximately 50 nm thick.

10. The magneto-optical recording medium of claim 1 wherein said recording layer comprises a thin film of rare-earth transition metal alloy of a composition $Dy_{0.23}(Fe_{0.78}Co_{0.22})_{0.77}$.

11. The magneto-optical recording medium of claim 1 wherein said auxiliary recording layer comprises a thin film of rare-earth transition metal alloy made of transition metal rich GdFeCo.

12. The magneto-optical recording medium of claim 8 wherein said thin film of said auxiliary recording layer is approximately 50 nm thick.

13. The magneto-optical recording medium of claim 1 wherein said auxiliary recording layer comprises a thin film of rare-earth transition metal alloy of a composition $Gd_{0.17}(Fe_{0.82}Co_{0.18})_{0.83}$.

14. The magneto-optical recording medium of claim 1 wherein a protective film of AlN of a thickness of approximately 20 nm is disposed on said auxiliary recording layer.

15. The magneto-optical recording medium of claim 1 wherein said recording layer comprises a thin film of rare-earth transition metal alloy made of rare-earth rich DyFeCo of a thickness of approximately 50 nm and a composition of $Dy_{0.35}(Fe_{0.78}Co_{0.22})_{0.65}$.

16. The magneto-optical recording medium of claim 1 further comprising a radiating layer disposed on said auxiliary recording layer, said radiating layer being comprised of a material selected from a group consisting of Au, Ag, Cu, SUS, Ta and Cr.

17. The magneto-optical recording medium of claim 1 further comprising at least one intermediate layer disposed between at least one of said readout layer and said recording layer, and said recording layer and said auxiliary recording layer.

18. The magneto-optical recording medium of claim 17 wherein said at least one intermediate layer is of a composition comprising FeCo.

19. The magneto-optical recording medium of claim 2 wherein said readout layer has in-plane magnetization at room temperature, and a magnetic state which changes into perpendicular magnetization as a temperature of the readout layer increases, and the readout layer has perpendicular magnetization until the temperature of the readout layer is raised to a temperature substantially equal to its Curie temperature.

20. The magneto-optical recording medium of claim 3 wherein said intermediate layer comprises a film having an in-plane magnetization in a temperature between room temperature and its Curie temperature.

21. The magneto-optical recording medium of claim 1 wherein said auxiliary recording layer is made of a TM-rich material and said recording layer comprises a thin film of a composition $Dy_{0.23}(Fe_{0.82}Co_{0.18})_{0.77}$ having a thickness of approximately 50 nm and said readout layer is of a composition $Gd_x(Fe_{0.82}Co_{0.18})_{1-x}$ wherein x is set in a range of $0.20<x<0.32$.

22. The magneto-optical recording medium of claim 1 wherein said readout layer is made of an RE-rich material and said auxiliary recording layer is of a composition $Gd_x(Fe_{0.82}Co_{0.18})_{1-x}$ wherein x is set in a range of $0.10<x<0.20$.

23. The magneto-optical recording medium of claim 22 wherein said auxiliary recording layer has a thickness of not smaller than 10 nm.

* * * * *